United States Patent
Brandt et al.

(10) Patent No.: US 10,853,915 B2
(45) Date of Patent: *Dec. 1, 2020

(54) GENERATING VIRTUAL REALITY CONTENT BASED ON CORRECTIONS TO STITCHING ERRORS

(71) Applicant: Verizon Patent and Licensing Inc., Arlington, VA (US)

(72) Inventors: Olaf Brandt, Palo Alto, CA (US); Anatoli Adamov, Palo Alto, CA (US); Arthur Van Hoff, Palo Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,718

(22) Filed: Feb. 13, 2020

(65) Prior Publication Data

US 2020/0184601 A1 Jun. 11, 2020

Related U.S. Application Data

(63) Continuation of application No. 15/893,547, filed on Feb. 9, 2018, now Pat. No. 10,600,155.

(60) Provisional application No. 62/456,866, filed on Feb. 9, 2017.

(51) Int. Cl.
| | |
|---|---|
| *H04N 5/77* | (2006.01) |
| *G06T 3/40* | (2006.01) |
| *G06T 1/20* | (2006.01) |
| *H04N 5/341* | (2011.01) |
| *H04N 5/232* | (2006.01) |
| *H04N 5/225* | (2006.01) |
| *H04N 13/111* | (2018.01) |

(Continued)

(52) U.S. Cl.
CPC ............. *G06T 3/4038* (2013.01); *G06T 1/20* (2013.01); *H04N 5/2258* (2013.01); *H04N 5/23206* (2013.01); *H04N 5/23238* (2013.01); *H04N 5/3415* (2013.01); *H04N 13/111* (2018.05); *H04N 13/246* (2018.05); *G06T 2207/20221* (2013.01); *H04L 67/12* (2013.01); *H04L 67/327* (2013.01)

(58) Field of Classification Search
CPC .................... G06T 3/4038; G06T 1/20; G06T 2207/20221; H04N 13/246; H04N 13/111; H04N 5/2258; H04N 5/23206; H04N 5/23238; H04N 5/3415; H04L 67/327; H04L 67/12

See application file for complete search history.

(56) References Cited

U.S. PATENT DOCUMENTS

| | | | |
|---|---|---|---|
| 9,363,569 B1 * | 6/2016 | van Hoff | H04N 21/4223 |
| 2014/0244804 A1 * | 8/2014 | Ying | H04L 65/602 709/219 |
| 2017/0206707 A1 * | 7/2017 | Guay | G06F 16/2246 |

(Continued)

*Primary Examiner* — Howard D Brown, Jr.

(57) ABSTRACT

Illustrative methods and systems for generating virtual reality content based on corrections to stitching errors are described. An illustrative computer-implemented method includes receiving raw virtual reality video data representing images recorded by camera modules of a camera array, stitching the images together to generate an initial virtual reality render, determining that the initial virtual reality render has a stitching error, and generating a corrected virtual reality render that corrects the stitching error.

20 Claims, 10 Drawing Sheets

(51) Int. Cl.
*H04N 13/246* (2018.01)
*H04L 29/08* (2006.01)

(56) References Cited

U.S. PATENT DOCUMENTS

| | | | |
|---|---|---|---|
| 2017/0285738 A1* | 10/2017 | Khalid | G06F 3/04842 |
| 2017/0289219 A1* | 10/2017 | Khalid | G06F 3/00 |
| 2017/0316607 A1* | 11/2017 | Khalid | G06F 3/147 |
| 2017/0330365 A1* | 11/2017 | Adamov | H04L 67/10 |
| 2017/0330382 A1* | 11/2017 | Adamov | G06T 15/205 |
| 2018/0063428 A1* | 3/2018 | Rakhmanberdiyev | H04N 5/23258 |
| 2018/0091866 A1* | 3/2018 | Sun | H04N 21/61 |
| 2018/0172963 A1 | 6/2018 | Kim et al. | |
| 2018/0225805 A1* | 8/2018 | Brandt | H04N 13/111 |

* cited by examiner

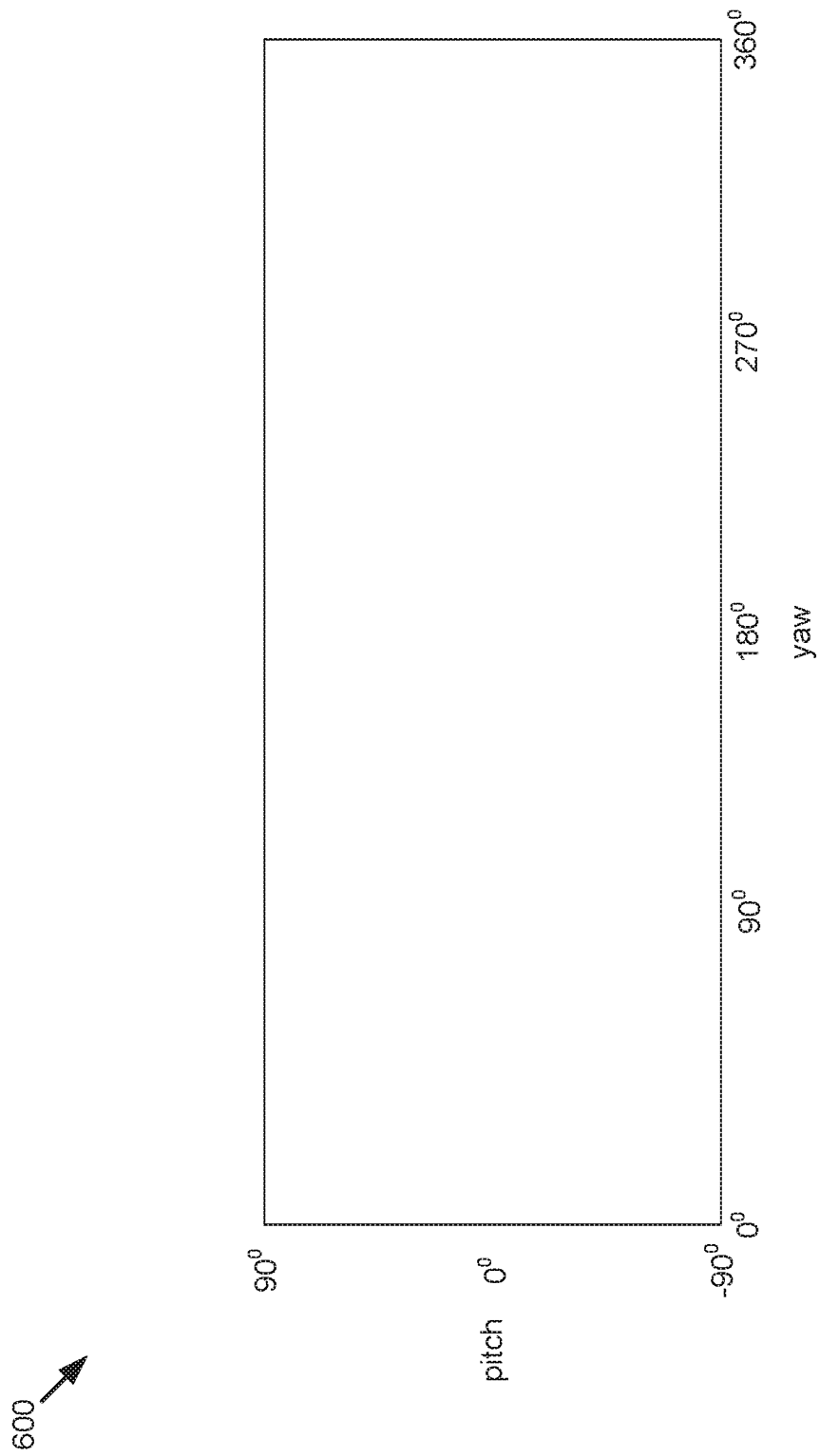

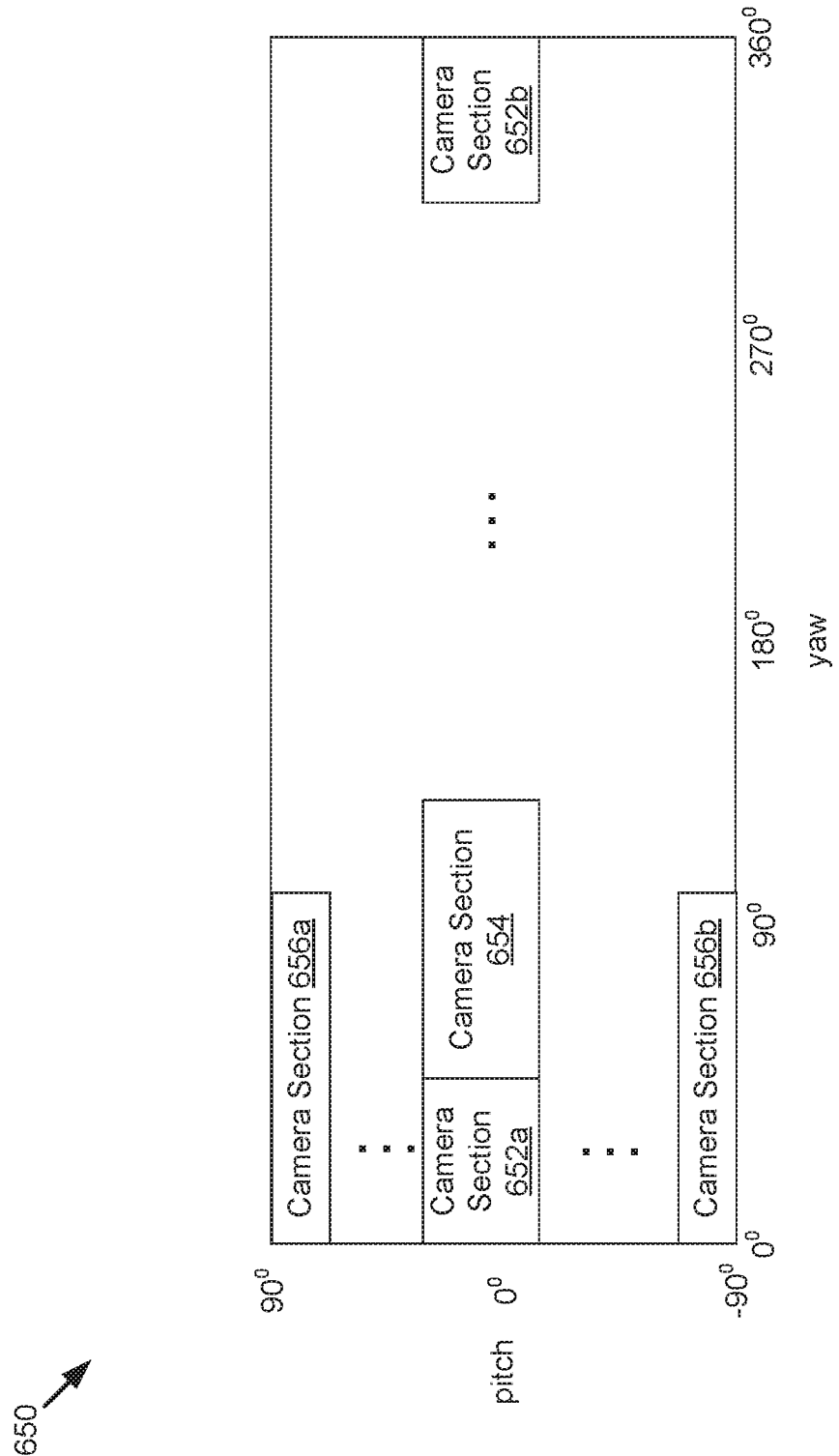

GENERATING VIRTUAL REALITY CONTENT BASED ON CORRECTIONS TO STITCHING ERRORS

RELATED APPLICATIONS

This application is a continuation application of U.S. patent application Ser. No. 15/893,547, filed Feb. 9, 2018, and entitled "Generating Virtual Reality Content Based on Corrections to Stitching Errors," which application claims benefit of U.S. Provisional Patent Application No. 62/456,866, filed Feb. 9, 2017 and entitled "Virtual Reality Stitching Tweaks in a Cloud-Based Virtual Reality Processing System," which are hereby incorporated by reference in their entirety.

FIELD

This disclosure relates generally to generating virtual reality content based on corrections to stitching errors.

BACKGROUND

Virtual reality content is becoming increasingly popular for both personal and business use. Virtual reality content includes 360-degree images of an environment that are stitched together from images received from discrete cameras. A virtual reality system that generates the virtual reality content may have stitching errors that result from trying to combine virtual reality feeds from multiple cameras. Previous attempts to solve this problem have included using a larger number of cameras so that there is more image overlap. However, this results in an overabundance of virtual reality content that may be too much data to process.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the invention include a method for correcting initial virtual reality video renders. The method may include receiving at a cloud-based server through a network interface, raw virtual reality video data recorded by camera modules of a camera array. The method further includes stitching the raw virtual reality video data, at the cloud-based server, to generate an initial virtual reality render. The method further includes determining that the initial virtual reality render has stitching errors.

The method further includes transmitting the initial virtual reality render from the cloud-based server to a user device. For example, the user device may provide a user with editing tools for identifying stitching errors. The method further includes receiving a correction to the initial virtual reality render from the user device. For example, the user may identify a location and/or a time when stitching errors occur. In some embodiments, the user device may transmit a corrected virtual reality render.

The method further includes generating virtual reality content based on the correction. The method further includes providing the virtual reality content to a viewing device. The viewing device may include the user device along with other hardware for viewing virtual reality content.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following detailed description is read with reference to the accompanying drawings.

FIG. 6A is a graphic representation that illustrates an example panoramic image.

FIG. 6B is a graphic representation that illustrates an example camera map.

DETAILED DESCRIPTION

Some systems and methods disclosed here are directed to implementing the combination of cloud computing with virtual reality processing systems. In some embodiments, stitching of raw video data may generate virtual reality video renders in the virtual reality processing system. In some embodiments, the generated virtual reality video renders may comprise errors, such as, for example stitching errors. In some embodiments, stitching errors may include, for example, parallax errors, synchronization errors, calibration errors, etc. In some embodiments, different methods may be implemented to fine-tune and/or correct the stitches of the virtual reality video renders so as to generate error free virtual reality video renders.

Example System

Figure 1:
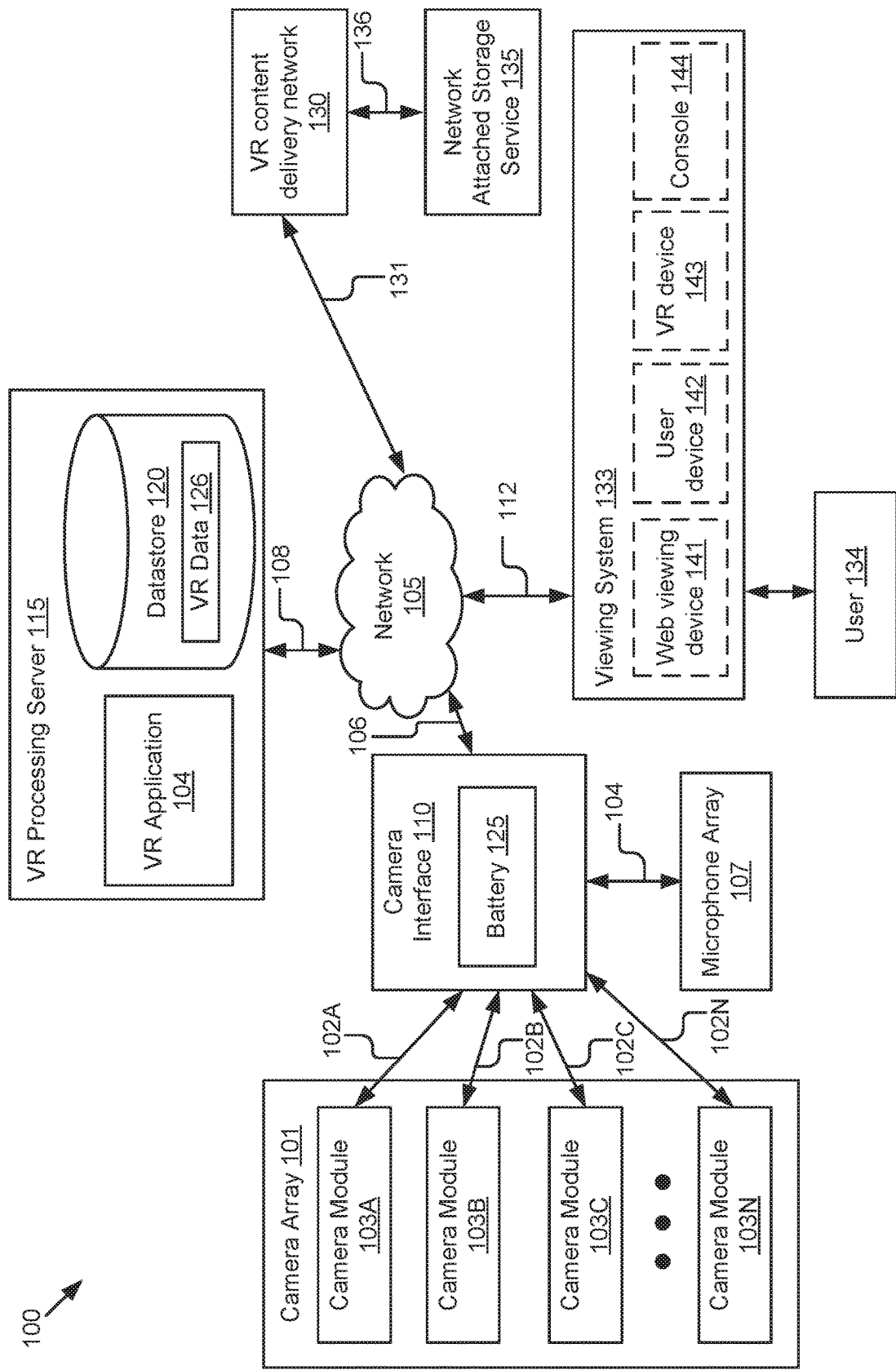
FIG. 1 is a block diagram of a cloud-based virtual reality content processing system according to some embodiments.

FIG. 1 illustrates a block diagram of a virtual reality system 100 that generates virtual reality content according to some embodiments. The virtual reality system 100 includes a camera array 101, a camera interface 110, a microphone array 107, a virtual reality (VR) processing server 115, a virtual reality content delivery network 130, and a viewing system 133. The camera interface 110, the virtual reality system 115, the virtual reality content delivery network 130, and the viewing system 133 may be communicatively coupled via a network 105.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiment without departing from the scope of the disclosure.

While FIG. 1 illustrates one camera array 101, one camera interface 110, one microphone array 107, one virtual reality processing server 115, one virtual reality content delivery network 130, and one viewing system 133, the disclosure applies to a system architecture having one or more camera arrays 101, one or more camera interfaces 110, one or more microphone arrays 107, one or more virtual reality processing servers 115, one or more virtual reality content delivery networks 130, and one or more viewing systems 133, or any combination thereof. Furthermore, although FIG. 1 illustrates one network 105 coupled to the entities of the virtual reality system 100, in practice one or more networks 105 may be connected to these entities and one or more networks 105 may be of various and different types.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth® communication networks or a cellular communication network for sending and receiving data including via short messaging service (SMS), multimedia messaging service (MMS), hypertext transfer protocol (HTTP), direct data connection, WAP, e-mail, etc. The network 105 may also include a mobile data network that may include 3G, 4G, 5G, LTE, VoLTE or any other cellular network, mobile data network or combination of mobile data networks. Further, the network 105 may include one or more IEEE 802.11 wireless networks.

The camera array 101 may comprise a modular camera system configured to capture raw video data that includes image frames. In the illustrated embodiment shown in FIG. 1, the camera array 101 includes camera modules 103A, 103B, 103C, 103N (also referred to individually and collectively herein as the camera module 103). While four camera modules 103A, 103B, 103C, 103N are illustrated in FIG. 1, the camera array 101 may include any number of camera modules 103.

For example, the camera array 101 may a first set of camera modules 103 that include twenty-four camera modules 103 and a stereo audio microphone. Each of these twenty-four camera modules 103 may record video and/or audio data onto an individual storage device (e.g., a secure digital (SD) memory card). Each of these twenty-four camera modules 103 may record video in high definition (HD) video data, 2K video data, 4K video data, or 5K video data. The camera array 101 may include a second set of camera modules 103 that include a plurality of 4K (or 2k) camera modules 103, a plurality of professional-grade (e.g., 'sili- cone ear') microphones, flexible control systems, and/or a novel 3-axis design. The second set of camera modules 103, for example, may include a 24, 30, 36, or 42 of 4K Blackmagic cameras. The second set of camera modules 103 may also include the EYE™ professional-grade VR camera system by 360 Designs. The camera array 101 may include a third set of camera modules 103 with eight, twelve, sixteen, twenty, etc. synchronized 2K>2K video sensors and a 360 surround sound audio array. The third set of camera modules 103, for example, may include the Nokio OZO virtual reality camera from Nokia.

As another example, one or more sets of camera modules 103 may include a GoPro™ camera rig (e.g., a 14 camera rig or a 16 camera rig). As another example, one or more camera modules 103 may include an OZO™ camera made by Nokia Technologies of Keilaniemi, Espoo. As another example, one or more camera modules 103 may include a Jaunt One™ camera made by Jaunt of Palo Alto, Calif., or any combination thereof.

In some embodiments, the camera array 101 may also include various sensors including, but not limited to, a depth sensor, a motion sensor (e.g., a global positioning system (GPS), an accelerometer, a gyroscope, etc.), a sensor for sensing a position of a camera module 103, and other types of sensors.

The camera array 101 may be constructed using various configurations. For example, camera modules 103A, 103B, 103C, 103N in the camera array 101 may be configured in different geometries (e.g., a sphere, a cylinder, a cone, a cube, etc.) with the corresponding lenses in the camera modules 103A, 103B, 103C, 103N facing toward different directions. The camera array 101 may comprise a flexible structure so that a particular the camera module 103 may be removed from the camera array 101 and new camera modules 103 may be added to the camera array 101.

In some embodiments, camera modules 103A, 103B, 103C, 103N in the virtual the camera array 101 may be oriented around a sphere in different directions with sufficient diameter and field of view to capture sufficient view disparity to render stereoscopic images. For example, the camera array 101 may include 32 Point Grey Blackfly Gigabit Ethernet cameras distributed around a 20-centimeter diameter sphere. Camera models that are different from the Point Grey Blackfly camera model may be included in the camera array 101.

In some embodiments, the camera array 101 may include a sphere whose exterior surface is covered in one or more optical sensors configured to render three-dimensional (3D) images or video. The optical sensors may be communicatively coupled to a controller. The entire exterior surface of the sphere may be covered in optical sensors configured to render 3D images or video.

According to some embodiments, camera modules 103 in the camera array 101 may be configured to have a sufficient field-of-view overlap so that all objects can be seen from more than one view point. For example, the horizontal field of view for each camera module 103 included in the camera array 101 is 70 degrees. In some embodiments, having the camera array 101 configured in such a way that an object may be viewed by more than one camera module 103 may be beneficial for correcting exposure or color deficiencies in the images captured by the camera array 101.

Camera modules 103 in the camera array 101 may or may not include built-in batteries. The camera modules 103 may obtain power from a battery 125 coupled to the camera interface 110. In some embodiments, the external cases of the camera modules 103 may be made of heat-transferring materials, such as metal, so that the heat in camera modules 103 may be dissipated more quickly than using other materials. In some embodiments, each camera module 103 may include a heat dissipation element. Examples of heat dissipation elements include, but are not limited to, heat sinks, fans, and heat-dissipating putty.

Each of the camera modules 103 may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

In some embodiments, camera modules 103A, 103B, 103C, 103N in the camera array 101 may form a daisy chain in which the camera modules 103A, 103B, 103C, 103N are connected in sequence. Camera modules 103A, 103B, 103C, 103N in the camera array 101 may be synchronized through the daisy chain. One camera module (e.g., the camera module 103A) in the daisy chain may be configured as a master camera module that controls clock signals for other camera modules 103 in the camera array 101. The clock signals may be used to synchronize operations (e.g., start operations, stop operations) of the camera modules 103 in the camera array 101. Through the synchronized start and stop operations of camera modules 103, the image frames in the respective video data captured by the respective camera modules 103A, 103B, 103C, 103N are also synchronized.

The camera modules 103 may be coupled to the camera interface 110. For example, the camera module 103A is communicatively coupled to camera interface 110 via signal line 102A, the camera module 103B is communicatively coupled to the camera interface 110 via signal line 102B, the camera module 103C is communicatively coupled to the camera interface 110 via signal line 102C, and the camera module 103N is communicatively coupled to the camera interface 110 via signal line 102N. In some embodiments, a signal line in the disclosure may represent a wired connection or any combination of wired connections such as connections using Ethernet cables, high-definition multimedia interface (HDMI) cables, universal serial bus (USB) cables, RCA cables, Firewire, CameraLink, or any other signal line suitable for transmitting video data and audio data. Alternatively, signal line in the disclosure may represent a wireless connection such as a wireless fidelity (Wi-Fi) connection or a Bluetooth® connection. In other embodiments, signal line may comprise a combination of a wired connection and a wireless connection.

The microphone array 107 may include one or more microphones configured to capture sounds from different directions in an environment. It is noted that the microphone array 107 may include different microphone systems (e.g., different makes and/or models of microphones). In some embodiments, the microphone array 107 may include one or more processors and one or more memories. The microphone array 107 may include a heat dissipation element. In the illustrated embodiment, the microphone array 107 is coupled to the camera interface 110 via signal line 104. Alternatively or additionally, the microphone array 107 may be directly coupled to other entities of the virtual reality system 100.

The microphone array 107 may be configured to capture sound from various directions. The sound may be stored as raw audio data on a non-transitory memory communicatively coupled to the microphone array 107, which may detect directionality of the sound. The directionality of the sound may be encoded and stored as part of the raw audio data.

In some embodiments, the microphone array 107 may include a Core Sound Tetramic soundfield tetrahedral microphone array following the principles of ambisonics, enabling reconstruction of sound from any arbitrary direction. For example, the microphone array 107 may include an ambisonics microphone mounted on top of the camera array 101 and used to record sound and sonic directionality. In some embodiments, the microphone array 107 includes a Joseph Grado HMP-1 recording system, or any other microphone system configured according to the same or similar acoustical principles.

In some embodiments, the camera modules 103 may be mounted around a camera housing (e.g., a spherical housing or a housing with another suitable shape). The microphone array 107 may include multiple microphones mounted around the same camera housing, with each microphone located in a different position. The camera housing may act as a proxy for the head-shadow sound-blocking properties of a human head. As described below with reference to FIG. 2, during playback of the recorded audio data, an audio module may select an audio track for a user's ear from a microphone that has a closest orientation to the user's ear. Alternatively, the audio track for the user's ear may be interpolated from audio tracks recorded by microphones that are closest to the user's ear. The camera interface 110 may receive the raw audio data recorded by the microphone array 107 and forward the raw audio data to the virtual reality processing server 115 for storage. The camera interface 110 may also receive and aggregate streams of raw video data describing image frames captured by respective camera modules 103. The camera interface 110 may transfer the raw video data to the virtual reality processing server 115 for storage.

The camera interface 110 is communicatively coupled to the network 105 via signal line 106. In some examples, the camera interface 110 may be a USB hub. In some embodiments, camera interface 110 includes one or more batteries 125 for supplying power to the camera modules 103 in the camera array 101. Alternatively or additionally, one or more batteries 125 may be coupled to the camera interface 110 for providing power to the camera modules 103.

In some embodiments, the camera interface 110 includes a client-side device that is connected with one or more camera modules 103 and/or a storage device having one or more recordings. The-client side device may have one or more interfaces within which a camera module 103 or a storage device can be connected and used to input recordings from the camera module 103 or a storage device. The camera interface 110 may also be connected to the network 105 and upload the recordings from the one or more camera modules 103 or the storage device to the virtual reality processing server 115 and/or to the virtual reality datastore 120. The camera interface 110, for example, may be a computer or laptop or may be connected with a computer or a laptop. The camera module 103 or a storage device may be connected to the camera interface 110 via USB, FireWire, HDMI, etc. Alternatively or additionally, the client device may include a storage device port such as, for example, an SD port, SD slot.

In some embodiments, the camera interface 110 also includes a server-side interface. The camera interface 110 may receive recordings from one or more camera modules 103 regardless of the camera type. The server-side interface, for example, may be hosted on a webserver and/or as part of the virtual reality processing server 115. The server-side interface, for example, may provide a number of data entry fields or widgets to collect information such as, for example, the number of camera modules 103, the data compression used to save the virtual reality content, the brand of the camera module 103, the serial number of the virtual reality, the model of the camera module 103, the type of audio being uploaded, the angular position of the camera modules 103, the files comprising the video and/or audio data from each individual camera module 103, etc.

In some embodiments, the recordings received from the camera modules 103 may be uploaded to the virtual reality processing server 115 and/or stored in the datastore 120.

The virtual reality processing server 115 may be a hardware server that includes a virtual reality application 104, a datastore 120, a processor, a memory, and network communication capabilities. In the illustrated embodiment, the virtual reality processing server 115 is coupled to the network 105 via signal line 108. The virtual reality processing server 115 sends and receives data to and from one or more of the other entities of the virtual reality system 100 via the network 105.

The virtual reality processing server 115 may receive raw video data and raw audio data from the camera interface 110 via the network 105. In some embodiments, the virtual reality processing server 115 may store the raw video data and raw audio data in the datastore 120 as virtual reality data 126. In some embodiments, the virtual reality processing server 115 may aggregate raw video data captured by the camera modules 103 to form virtual reality streams, aggregate raw audio data captured by the microphone array 107 to form 3D audio data, and combine the virtual reality streams and the 3D audio data to form virtual reality content that is stores as virtual reality data 126 in the datastore 120.

In some embodiments, the virtual reality processing server 115 may be operable on a single server. In some embodiments, the virtual reality processing server 115 may be operable on a plurality of servers. In some embodiments, the virtual reality processing server 115 may be operable on a plurality of distributed servers that are located remotely relative to another across the Internet such as, for example, distributed virtual reality processing server 300 shown in FIG. 3.

The virtual reality processing server 115 may include a system configured to aggregate raw video data and raw audio data to generate 3D video data and 3D audio data, respectively. In some other embodiments, the virtual reality processing server 115 may be implemented using a combination of hardware and software. The virtual reality processing server 115, which may reside in the cloud, may be configured for aggregating raw video data captured by two or more camera modules 103 including two or more different camera systems. For example, the virtual reality processing server 115 may be configured to receive data from a first virtual reality camera system (e.g., first camera system (e.g., a GoPro™ camera rig) and a second virtual reality camera system (a Jaunt One™ camera made by Jaunt of Palo Alto, Calif.)), determine parameters for each camera system of the plurality of camera systems, and aggregate data from two or more of the plurality of camera systems.

In some embodiments, the virtual reality processing server 115 may create a virtual reality project from the virtual reality recordings uploaded to the virtual reality datastore 120. A virtual reality project may include, for example, virtual reality recordings, segments, and/or renders. In some embodiments, a virtual reality project may define access roles to various portions of the virtual reality recordings, segments, and/or renders that make up a given project. In some embodiments, the virtual reality project access roles may be defined based on the creator of the virtual reality project, the owner of the project, etc.

For example, a given production company may provide access rules for various participants in the production cycle. The director, writer, and/or producer, for example, may be given access to all the recordings, segments, and/or renders. Audio engineers, mixers, computer graphic artists, artists, and/or visual engineers etc. may be given access to specific segments such as, for example, specifically assigned and/or define segments. Marketers, executive producers, and/or investors may be given access to specific renders. The access roles may be defined and/or revised at any time.

A virtual reality project may include, for example, a plurality of recordings of a scene from a camera array 101. A recording may include video data from multiple camera modules 103 of the camera array 101. For example, if the camera array 101 recorded video from twenty-four camera modules 103, a recording may include video data from each of the twenty-four camera modules 103.

A virtual reality project may include, for example, a plurality of segments of the plurality of recordings. Each segment, for example, may be a portion of a virtual reality recording that is divided into portions based on time, view, location, angle, view, and/or camera module 103. For example, if a camera array 101 recorded video from twenty-four camera modules 103, a segment may include video data from one camera module 103 of the camera array 101 recorded between two distinct time stamps. Alternatively or additionally, for example, a segment may include video data from more than one camera module 103 of the camera array 101 recorded between two distinct time stamps.

A render can include one or more segments stitched together in such a way to form virtual reality content that may be viewed on a virtual reality headset and/or allow 360 degree viewing of a scene. For example, a render may include video data for a stereoscopic virtual reality headset that allows for 360 views of a scene.

In some embodiments, the virtual reality processing server 115 may create segments based on user input that specify the frames or times that bound the segments.

In some embodiments, the virtual reality processing server 115 may create a render from recordings or segments. The stitching process for making a render, for example, may depend any number of factors such as, for example, the number of camera modules 103 on the camera array 101, the type of viewing device used to view the virtual reality render, the type of virtual reality render (e.g., conical vs. spherical), stereo vs. mono, etc.

In these and other embodiments, the virtual reality processing server 115 may include a stitching algorithm for stitching images together to form a 3D panorama described by the 3D video data. For example, the virtual reality processing server 115 may stitch the video from multiple camera modules 103 into two large-format, panoramic video for left and right eye viewing.

The virtual reality processing server 115 may generate the 3D video data based on the raw video data received from the camera modules 103 of the camera array 101. For example, the virtual reality processing server 115 may stitch the image frames together based on a frame sync signal in the video and by using audio tracks from a mounted microphone and/or microphones in each camera module 103 of the camera array 101 to time-align audio tracks from the microphones. In some embodiments, the stitching is also based on the geometric calibration. The virtual reality processing server 115 may include the stitching algorithm for stitching images captured by the camera modules 103 together to form a 3D panorama described by the 3D video data. For example, the virtual reality processing server 115 may stitch the raw video data from multiple camera modules 103 into two large-format, panoramic video for left and right eye viewing.

Virtual reality renders may be created in any number of ways by the virtual reality processing server 115. In some embodiments, the virtual reality processing server 115 may identify a location and/or a timing associated with each of the camera modules 103 within a camera array 101. The virtual reality processing server 115 may synchronize the various video frames within a segment and/or recording based on locations and/or timings associated with the camera modules 103. The virtual reality processing server 115 may construct a left camera map and/or a right camera map. The left camera map, for example, may identify matching camera modules 103 for pixels in a left panoramic image. For example, for a pixel in a left panoramic image that represents a point in a panorama, the left camera map identifies a matching camera module 103 that has a better view to the point than other camera modules 103. Similarly, the right camera map may identify matching camera modules 103 for pixels in a right panoramic image.

In some embodiments, the virtual reality processing server 115 may generate, based on the left camera map, left panoramic images from the video frames within a segment or recording. For example, the virtual reality processing server 115 may identify matching camera modules 103 for pixels in left panoramic images based on the left camera map. The virtual reality processing server 115 may stitch image frames that are captured by the corresponding matching camera modules 103 at a particular time to form a corresponding left panoramic image. In some embodiments, the virtual reality processing server 115 may correct color deficiencies in the left panoramic images. In some embodiments, the virtual reality processing server 115 may correct stitching errors in the left panoramic images.

In some embodiments, the virtual reality processing server 115 may generate, based on the right camera map, right panoramic images from the video frames within a segment or recording. For example, the virtual reality processing server 115 may identify matching camera modules 103 for pixels in right panoramic images based on the right camera map. The virtual reality processing server 115 may stitch image frames that are captured by the corresponding matching camera modules 103 at a particular time to form a corresponding right panoramic image. In some embodiments, the virtual reality processing server 115 may correct color deficiencies in the right panoramic images. In some embodiments, the virtual reality processing server 115 may correct stitching errors in the right panoramic images.

In some embodiments, the virtual reality processing server 115 may compress the left panoramic images and the right panoramic images to generate compressed 3D video data. In some embodiments, the virtual reality processing server 115 may generate audio data (or 3D audio data) from the raw audio data. In some embodiments, the virtual reality processing server 115 may generate content that includes the compressed 3D video data and the 3D audio data. In some embodiments, the virtual reality processing server 115 may also compress the 3D audio data to form a compressed 3D audio data, and the virtual reality content may include the compressed 3D video data and the compressed 3D audio data.

In some embodiments, a user may be provided access to a render, recording, and/or segment for various purposes such as, for example, to edit a video or audio. For example, a user may use editing tools to edit a video using a video editing tools and/or edit audio using various audio editing tools. Any type of digital video and/or digital audio editing tools may be used. A user may request a specific render, recording, or segment from the virtual reality processing server 115 through the network 105. A copy of the specific render, recording, or segment may be pushed to the video processing tool and/or the audio processing tool from the virtual reality processing server 115 in response to the request. In some embodiments, as part of the request, the user may submit a user identification (e.g., a user name), a password, and/or other credentials allowing the user to access the render, recording, and/or segment. In some embodiments, the user may request the render, recording, and/or segment by file name, by project name, by render name, by segment name, by recording name, by video frame number, by time, by location, by a time period, by a video frame range, etc.

In some embodiments, the virtual reality processing server 115 includes editing tools. The editing tools may be used to automatically analyze the virtual reality video renders for errors, for example stitching errors. In some embodiments, the editing tools may also be used to edit the virtual reality video renders to remove the stitching errors. In some embodiments, the editing tools may video editing tools and audio editing tools. In other embodiments, the editing tools may include editing tools other than video editing tools and audio editing tools.

After editing the render, recording, and/or segment the user may submit the edited render, recording, and/or segment to the virtual reality processing server 115. The virtual reality processing server 115 may retrieve or receive the edited render, recording, and/or segment and store the edited render, recording, and/or segment may be stored in virtual reality datastore 120 as another version of the render, recording, and/or segment.

The virtual reality content delivery network 130 may provide virtual reality content of various formats to a number of viewing systems 133 that may each have specific formatting requirements. The virtual reality content delivery network 130 may provide the virtual reality content to the viewing system 133 through the network 105. The virtual reality content delivery network 130 may be connected to the network 105 via signal line 131.

In some embodiments, the virtual reality content delivery network 130 may provide virtual reality content having any of various formats to users. For example, a virtual reality format may differ from other virtual reality formats based on geometry, the video container, the playback device, etc. For example, the geometry of a virtual reality format may include a conical, planer, spherical, three-dimensional, panoramic, etc. geometry. As another example, the video container of the virtual reality format may include an MP4, WebM, VP8, etc. container. As yet another example, virtual reality format may be specific to a playback device or model such as, for example, one of the following example playback devices Project StarVR, Oculus Rift, AirVR, Avegant Glyph, Cmoar, Durovis Dive, Dior Eyes VR, Emax X1 Fove, Google Cardboard, Homido, HTC Vive, ImmersiON-VRelia BlueSky, Impression Pi, MindMaze NeuroGoggles, Pinch VR, Razer OSVR, Samsung Gear VR, Sony Project Morpheus, Viewbox, Visus, VR Union Claire, Vrvana Totem, Xingear XG, Zeiss One VR, etc.

In some embodiments, the virtual reality content delivery network 130 may be coupled with one or more network attached virtual reality storage service 135. The network attached virtual reality storage service 135 may be a separate storage location from the datastore 120 associated with the virtual reality processing server 115. In some embodiments, the network attached virtual reality storage service 135 may be a cloud-based storage location. In some embodiments, the network attached virtual reality storage service 135 may be a distributed and/or remote cloud-based storage location such as, for example, the distributed virtual reality processing server 300 shown in FIG. 3. The virtual reality storage service 135 is coupled to the virtual reality content delivery network 130 via signal line 136.

The viewing system 133 may include or use a computing device to decode and render a stream of 3D video data on a virtual reality display device. The viewing system 133 may also decode and render a stream of 3D audio data on an audio reproduction device (e.g., a headphone or other suitable speaker devices). The viewing system 133 may include a virtual reality display configured to render the 3D video data and the audio reproduction device configured to render the 3D audio data. The viewing system 133 may be coupled to the network 105 via signal line 112. A user 134 may interact with the viewing system 133.

The viewing system 133 may include a web viewing device 141, a user device 142, a virtual reality device 143, and/or a console 144. Various other virtual reality devices may request and/or receive virtual reality content from the virtual reality content delivery network 130. The web viewing device may include a computer, a laptop, or a tablet. The user device may include a smartphone or a tablet that may include a virtual reality application to play back virtual reality content and/or may require the use of a virtual reality device in conjunction with the smartphone such as, for example, Google Cardboard. The virtual reality device may include any type of virtual reality headset; augmented reality glasses; televisions, smartphones, tablets, or other devices with 3D displays and/or position tracking sensors; and display devices with a viewing position control such as, for example, Project StarVR, Oculus Rift, AirVR, Avegant Glyph, Cmoar, Durovis Dive, Dior Eyes VR, Emax X1, Fove, Google Cardboard, Homido, HTC Vive, ImmersiON-VRelia BlueSky, Impression Pi, MindMaze NeuroGoggles, Pinch VR, Razer OSVR, Samsung Gear VR, Sony Project Morpheus, Viewbox, Visus, VR Union Claire, Vrvana Totem, Xingear XG, Zeiss One VR, etc.

In some embodiments, the viewing system 133 may receive VR content from the virtual reality processing server 115. The VR content may include one or more of a stream of 3D video data, a stream of 3D audio data, a compressed stream of 3D video data, a compressed stream of 3D audio data, and other suitable content.

The viewing system 133 may track a head orientation of a user. For example, the viewing system 133 may include one or more accelerometers or gyroscopes used to detect a change in the orientation of the user's head. The viewing system 133 may decode and render the stream of 3D video data on a virtual reality display device and the stream of 3D audio data on a speaker system based on the head orientation of the user. As the user changes his or her head orientation, the viewing system 133 may adjust the rendering of the 3D video data and 3D audio data based on changes of the user's head orientation.

The viewing system 133 may provide an immersive viewing experience to the user 134. For example, the viewing system 133 may include a virtual reality display device that has a wide field of view so that the user 134 viewing the virtual reality content feels like he or she is surrounded by the virtual reality content in a manner similar to in a real-life environment. A complete 360-degree view of the scene is provided to the user 134, and the user 134 may view the scene in any direction. As the user 134 moves his or her head, the view is modified to match what the user 134 would see as if he or she were moving his or her head in the real world. By providing a different view to each eye (e.g., a stream of left panoramic images for left eye viewing and a stream of right panoramic images for right eye viewing), which simulates what the left and right eyes may see in the real world, the viewing system 133 may give the user 134 a 3D view of the scene. Additionally, 3D surrounding sound may be provided to the user 134 based on the user's head orientation to augment the immersive 3D viewing experience. For example, if a character in an immersive movie is currently behind the user 134, the character's voice may appear to be emanating from behind the user 134.

In some embodiments, the viewing system 133 includes a peripheral device such as a microphone, camera, mouse, console, or keyboard that is configured to enable the user 134 to provide an input to one or more components of the virtual reality system 100. For example, the user 134 may interact with the peripheral device to provide a status update to a social network service accessible through the network 105. In some embodiments, the peripheral device includes a camera such as the Microsoft® Kinect or another similar device, which allows the user 134 to provide gesture inputs to the viewing system 133 or other entities of the virtual reality system 100. The console may include any type of console that may play virtual reality content such as, for example, a gaming console.

Example Computing Device

Figure 2:
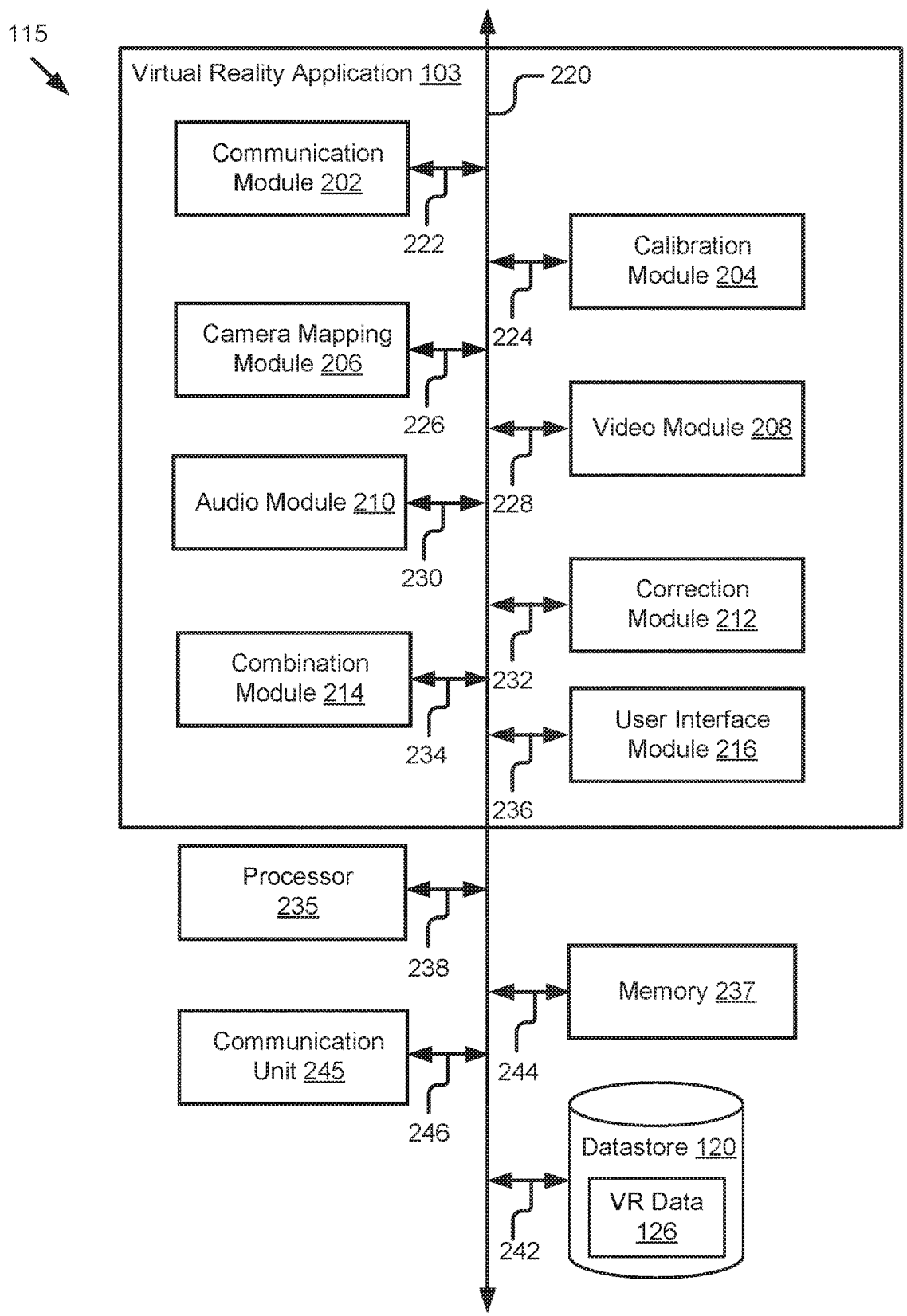
FIG. 2 is a block diagram of an example virtual reality processing server according to some embodiments.

FIG. 2 is a block diagram of an example virtual reality processing server 115. The virtual reality processing server 115 is a computing device that may include a virtual reality application 104, a processor 235, a memory 237, a communication unit 245, and a datastore 120. In some embodiments, the components of the virtual reality processing server 115 may be communicatively coupled via a bus 220. Moreover, the virtual reality processing server 115 may be distributed among a plurality of servers where each server includes one or more components shown in FIG. 2 such as, for example, the distributed virtual reality processing server 300 shown in FIG. 3.

The processor 235 may include an arithmetic logic unit, a microprocessor, a general-purpose controller, or some other processor array to perform computations and provide electronic display signals to a display device. The processor 235 is coupled to the bus 220 for communication with the other components via signal line 238. The processor 235 may process data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays, and physical configurations may be possible.

The memory 237 includes a non-transitory memory that stores data for providing the functionality described herein. The memory 237 may be a dynamic random access memory (DRAM) device, a static random access memory (SRAM) device, flash memory, or some other memory devices. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 237 may store the code, routines, and data for the virtual reality application 104 to provide its functionality. The memory 237 is coupled to the bus 220 via signal line 244.

The communication unit 245 may transmit data to any of the entities of the virtual reality system 100 depicted in FIG. 1. Similarly, the communication unit 245 may receive data from any of the entities of the virtual reality system 100 depicted in FIG. 1. The communication unit 245 may include one or more Ethernet switches for receiving the processed virtual reality video data from the worker node server 150 and the raw audio data from the connection hub 123. The communication unit 245 is coupled to the bus 220 via signal line 246.

In some embodiments, the communication unit 245 includes a port for direct physical connection to the network 105 of FIG. 1, or to another communication channel. For example, the communication unit 245 may include a port such as a USB, SD, RJ45, or similar port for wired communication with another computing device. In some embodiments, the communication unit 245 includes a wireless transceiver for exchanging data with another computing device or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to a network for distribution of data using standard network protocols including TCP/IP, HTTP, HTTPS, and SMTP, etc.

The datastore 120 may be a non-transitory storage medium that stores data for providing the functionality described herein. The datastore 120 may be a dynamic random access memory (DRAM) device, a static random access memory (SRAM) device, flash memory, or some other memory devices. In some embodiments, the datastore 120 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The datastore 120 is communicatively coupled to bus 220 via signal line 242.

In the embodiment illustrated in FIG. 2, the virtual reality application 104 includes a communication module 202, a calibration module 204, a camera mapping module 206, a video module 208, an audio module 210, a correction module 212, a combination module 214, and a user interface module 216.

In some embodiments, each module of the virtual reality application 104 (e.g., modules 202, 204, 206, 208, 210, 212, 214, 216) may include a respective set of instructions executable by the processor 235 to provide its respective functionality, as described herein. In some embodiments, each module of the virtual reality application 104 may be stored in the memory 237 of the virtual reality processing server 115 and may be accessible and executable by the processor 235. Each module of the virtual reality application 104 may be adapted for cooperation and communication with the processor 235 and other components of the virtual reality processing server 115.

The communication module 202 may be software including routines for handling communications between the virtual reality processing server 115 and other components of the virtual reality processing server 115. The communication module 202 may be communicatively coupled to the bus 220 via a signal line 222. The communication module 202 sends and receives data, via the communication unit 245, to and from one or more of the entities of the virtual reality system 100 depicted in FIG. 1. For example, the communication module 202 may receive raw video data from the camera interface 110 via the communication unit 245 and may forward the raw video data to the video module 208. In another example, the communication module 202 may receive virtual reality content from the combination module 214 and may send the virtual reality content to a viewing system 133 via the communication unit 245.

In some embodiments, the communication module 202 receives data from components of the virtual reality processing server 115 and stores the data in memory 237 or the datastore 120. For example, the communication module 202 receives virtual reality content from the combination module 214 and stores the virtual reality content in the datastore 120 as virtual reality data 126. In some embodiments, the communication module 202 retrieves data from the memory 237 or datastore 120 and sends the data to one or more appropriate components of the virtual reality processing server 115. Alternatively or additionally, the communication module 202 may also handle communications between components of the virtual reality processing server 115. For example, the communication module 202 may transmit virtual reality data 126 to the correction module 212 for correction.

The calibration module 204 may be software including routines for calibrating the raw virtual reality video data received from camera modules 103 in the camera array 101. The calibration module 204 may be adapted for cooperation and communication with the processor 235 and other components of the computing device 200 via signal line 224.

According to various embodiments, the calibration module 204 may determine one or more parameters for each camera module 103 within the camera array 101. For example, the calibration module 204 may access stored parameters for each camera module 103 (e.g., in the memory 237). Further, if required (e.g., due to a lack of information regarding a specific camera module), parameters of a camera module 103 may be received prior to, during, or after receiving virtual reality video data from the specific camera module 103. As an example, a user may input the parameters (e.g., via an electronic device). In another example, uploaded video data from a specific camera module 103 may include metadata comprising parameters for the specific camera module 103. As will be appreciated, one or more parameters for camera modules 103 may be used for distortion correction, rendering of virtual reality video data, and/or stitching of virtual reality video data.

In some embodiments, lenses included in the camera modules 103 may have some amount of spherical distortion. Images captured with the camera modules 103 may have a barrel distortion or a pin-cushion distortion that needs to be corrected during creation of panoramic images from the distorted images. The barrel distortion may be referred to as a "fish eye effect." For each camera module 103, the calibration module 204 may calibrate a lens in a corresponding the camera module 103 to determine associated distortion caused by the lens. For example, a snapshot of a test pattern that has known geometries placed in a known location (e.g., a checkerboard in a known location) may be captured by the camera module 103. The calibration module 204 may determine properties of a lens included in the camera module 103 from the snapshot of the test pattern. Properties of a lens may include, but are not limited to, distortion parameters, an optical center, and other optical properties associated with the lens.

The calibration module 204 may store data describing the properties of each lens in a configuration file. The configuration file may include data describing properties of all lenses of all the camera modules 103 in the camera array 101. For example, the configuration file includes data describing distortion parameters, an optical center, and other optical properties for each lens in the camera array 101.

Alternatively or additionally, the calibration module 204 may perform multi-camera geometric calibration on the camera array 101 to determine variations in the physical properties of the camera array 101. For example, the calibration module 204 may determine slight variations in camera orientation for each lens in the camera array 101, where the slight variations in the camera orientation may be caused by human errors occurring during an installation or manufacture process of the camera array 101. In another example, the calibration module 204 may estimate errors in the predicted roll, pitch, and yaw of a corresponding lens in each camera module 103. The calibration module 204 may determine a position and a rotational offset for the corresponding lens in each camera module 103 and may store the position and the rotational offset for the corresponding lens in the configuration file. As a result, the relative position of two lenses in the camera array 101 may be determined based on the positions and rotational offsets of the two corresponding lenses. For example, spatial transformation between each two lenses may be determined based on the positions and rotational offsets of the two corresponding lenses.

The camera mapping module 206 may comprise software including routines for constructing a left camera map and a right camera map. The camera mapping module 206 may be adapted for cooperation and communication with the processor 235 and other components of the computing device 200 via signal line 226.

A two-dimensional (2D) spherical panoramic image may be used to represent a panorama of an entire scene. As described below with reference to the video module 208, two stereoscopic panorama images may be generated for two eyes to provide a stereoscopic view of the entire scene. For example, a left panoramic image may be generated for the left eye viewing and a right panoramic image may be generated for the right eye viewing. An example panoramic image is illustrated in FIG. 6A.

A pixel in a panoramic image may be presented by a yaw value and a pitch value. Yaw represents rotation around the center and may be represented on the horizontal x-axis as:

$$\text{yaw} = 360° \times x/\text{width}. \quad (1)$$

Yaw has a value between 0° and 360°. Pitch represents up or down rotation and may be represented on the vertical y-axis as:

$$\text{pitch} = 90° \times (\text{height}/2 - y)/(\text{height}/2). \quad (2)$$

Pitch has a value between −90° and 90°.

The panoramic images may give a sense of real depth by exploiting a human brain's capacity to transform disparity (e.g., shifts in pixel positions) into depth. For example, a nearby object may have a larger disparity than a far-away object. Disparity may represent pixel shifts in positions between two images. Disparity may be caused by an interocular distance which represents a distance between two eyes. Each eye may receive a slightly different image, which creates a sense of depth.

Typical stereoscopic systems (e.g., 3D movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at a position with yaw$\in[0°,360°]$ and pitch=0° in a left panoramic image may represent an eye viewing position of the left eye as the head is rotated to the position indicated by the yaw value and the pitch value. Similarly, a pixel at the position with yaw$\in[0°,360°]$ and pitch=0° in a right panoramic image represents an eye viewing position of the right eye as the head is rotated to the position indicated by the yaw value and the pitch value. For pitch=0° (i.e., no up and down rotations), as the head is rotated from yaw=0° to yaw=360°, a blended panorama for eye viewing positions with all 360-degree head rotations in the horizontal axis may be produced.

In some embodiments, the blended panorama is effective for head rotations along the horizontal axis (e.g., yaw) but not for the vertical axis (e.g., pitch). As a user tilts his or her head upwards or downwards (e.g., pitch 0°), the dominant orientation of the user's eyes with respect to points on the sphere may become less well defined compared to pitch=0°. For example, when the user looks directly upward with pitch=90°, the orientation of the user's eyes with respect to the north pole point of the sphere may be completely ambiguous since the user's eyes may view the north pole point of the sphere from any yaw. Stereo vision may not be supported in the upward and downward directions using left/right eye spheres that are supported in the horizontal orientation. As a result, binocularity may be phased out by diminishing the interocular distance with an adjustment function f(pitch). An output of the adjustment function f(pitch) may decline from 1 to 0 as the pitch increases from 0° to 90° or decreases from 0° to −90°. For example, the adjustment function f(pitch) may include cos(pitch). The interocular distance may be adjusted based on the adjustment function f(pitch). For example, the interocular distance associated with the pitch may be adjusted as:

$$\text{interocular distance} = \max(\text{interocular distance}) \times f(\text{pitch}), \quad (3)$$

wherein max(interocular distance) represents the maximum value of the interocular distance (e.g., the interocular distance is at its maximum when) pitch=0°.

If f(pitch)=cos(pitch), then the interocular distance may be expressed as:

$$\text{interocular distance} = \max(\text{interocular distance}) \times \cos(\text{pitch}). \quad (4)$$

In some examples, the maximum value of the interocular distance may be about 60 millimeters. In other examples, the maximum value of the interocular distance may have a value greater than 60 millimeters or less than 60 millimeters.

The camera mapping module 206 may construct a left camera map that identifies a corresponding matching camera module 103 for each pixel in a left panoramic image. For example, for a pixel in a left panoramic image that represents a point in a panorama, the left camera map may identify a matching camera module 103 that has a best view for the point in the panorama compared to other camera modules 103. Thus, the left camera map may map pixels in a left panoramic image to matching camera modules 103 that have best views for the corresponding pixels. Determination of a matching camera module 103 for a pixel is described below in more detail.

An example camera map is illustrated in FIG. 6B. A camera map may include a left camera map or a right camera map. A camera map may use (yaw, pitch) as an input and may generate an output of (an identifier of a matching camera module, x, y), indicating a pixel (yaw, pitch) in a panoramic image may be obtained as a pixel (x, y) in an image plane of the identified matching camera module. The camera map may store the output (an identifier of a matching camera module, x, y) in a map entry related to the input (yaw, pitch). Pixels in an image plane of a camera module may be determined by using a camera model (e.g., a pinhole camera model or more complex lens model) to map points in 3D space onto pixels in the image plane of the camera module, where the points in the 3D space are assumed to be at a particular distance from the camera module. For example, referring to FIG. 7A, a distance for a point 716 may refer to a distance from point 716 to a center of the virtual reality camera system 109. The distance may be set at a fixed radius or varied as a function of pitch and yaw. The distance may be determined by: (1) measuring the scene; (2) manual adjustment by a human operator; (3) using a depth sensor to measure depths of the points in the 3D space; or (4) determining the depths using stereo disparity algorithms.

For each pixel in a left panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the left eye (e.g., a left viewing direction) to the corresponding point in the panorama.

In some embodiments, a matching camera module 103 for a pixel in a left panoramic image that has a better view of the pixel may have a viewing direction to a point in a panorama that corresponds to the pixel in the left panoramic image. The viewing direction of the matching camera module 103 is closer to the left viewing direction than other viewing directions of other camera modules 103 to the same point in the panorama. For example, referring to FIG. 7A, the viewing direction 714 of matching camera module 103A is more parallel to a left viewing direction 704 than other viewing directions of other camera modules 103. In other words, for each pixel in the left panoramic image, the left camera map may identify a corresponding matching camera module 103 that has a viewing direction most parallel to the left viewing direction than other viewing directions of other camera modules 103. Illustrations of a matching camera module 103 with a more parallel viewing direction to a left viewing direction are illustrated with reference to FIGS. 7A and 7B.

Similarly, the camera mapping module 206 may construct a right camera map that identifies a corresponding matching camera module 103 for each pixel in a right panoramic image. For example, for a pixel in a right panoramic image that represents a point in a panorama, the right camera map may identify a matching camera module 103 that has a better view for the point in the panorama than other camera modules 103. Thus, the right camera map may map pixels in a right panoramic image to matching camera modules 103 that have better views for the corresponding pixels.

For each pixel in a right panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the right eye (e.g., a right viewing direction) to the corresponding point in the panorama.

In some embodiments, a matching camera module 103 for a pixel in a right panoramic image that has a better view of the pixel may have a viewing direction to a point in a panorama that corresponds to the pixel in the right panoramic image. The viewing direction of matching camera module 103 is closer to the right viewing direction than other viewing directions of other camera modules 103 to the same point in the panorama. For example, the viewing direction of matching camera module 103 is more parallel to the right viewing direction than other viewing directions of other camera modules 103. In other words, for each pixel in the right panoramic image, the right camera map may identify a corresponding matching camera module 103 that has a viewing direction most parallel to the right viewing direction than other viewing directions of other camera modules 103.

Since the physical configuration of the camera array 101 is fixed, the left and right camera maps are the same for different left panoramic images and right panoramic images, respectively. The left and right camera maps may be precomputed and stored to achieve a faster processing speed compared to an on-the-fly computation.

The video module 208 may comprise software including routines for generating a stream of 3D video data configured to render 3D video when played back on the viewing system 133. The video module 208 may be adapted for cooperation and communication with the processor 235 and other components of computing device 200 via signal line 228. The stream of 3D video data may describe a stereoscopic panorama of a scene that may vary over time. The stream of 3D video data may include a stream of left panoramic images for left eye viewing and a stream of right panoramic images for right eye viewing.

In some embodiments, the video module 208 may receive raw video data describing image frames from the various camera modules 103 in the camera array 101. The video module 208 identifies a location and timing associated with each of the camera modules 103 of the camera array 101 and synchronizes the image frames based on locations and timings of the camera modules 103 of the camera array 101. The video module 208 synchronizes corresponding image frames that are captured by different camera modules 103 of the camera array 101 at the same time.

For example, the video module 208 receives a first stream of image frames generated by a first camera module 103 and a second stream of image frames generated by a second camera module 103. The video module 208 identifies that the first camera module 103 is located at a position with yaw=0° and pitch=0° and the second camera module 103 is located at a position with yaw=30° and pitch=0°. The video module 208 synchronizes the first stream of image frames with the second stream of image frames by associating a first image frame from the first stream captured at a first particular time T=T0 with a second image frame from the second stream captured at the same particular time T=T0, a third image frame from the first stream captured at a second particular time T=T1 with a fourth image frame from the second stream captured at the same particular time T=T1, and so on and so forth.

In some embodiments, the video module 208 may send the synchronized image frames to the correction module 212 so that correction module 212 may correct calibration errors in the synchronized image frames. For example, the correction module 212 may correct lens distortion, orientation errors, and rotation errors, etc., in the image frames. The correction module 212 may send the image frames back to the video module 208 after correcting the calibration errors.

The video module 208 may receive a left camera map and a right camera map from the camera mapping module 206. Alternatively, the video module 208 may retrieve the left and right camera maps from the memory 237 or the datastore 120. The video module 208 may construct a stream of left panoramic images from the image frames based on the left camera map. For example, the video module 208 identifies matching camera modules 103 listed in the left camera map. The video module 208 constructs a first left panoramic image PIL,0 by stitching image frames that are captured by matching camera modules 103 at a first particular time T=T0. The video module 208 constructs a second left panoramic image PIL,1 by stitching image frames that are captured by matching camera modules 103 at a second particular time T=T1, and so on and so forth. The video module 208 constructs the stream of left panoramic images to include the first left panoramic image PIL,0, the second left panoramic image PIL,1, and other constructed left panoramic images.

Specifically, for a pixel in a left panoramic image PIL,i at a particular time T=Ti (i=0, 1, 2, . . . ), the video module 208: (1) identifies a matching camera module 103 from the left camera map; and (2) configures the pixel in the left panoramic image PIL,i to be a corresponding pixel from an image frame that is captured by matching camera module 103 at the particular time T=Ti. The pixel in the left panoramic image PIL,i and the corresponding pixel in the image frame of matching camera module 103 may correspond to the same point in the panorama. For example, for a pixel location in the left panoramic image PIL,i that corresponds to a point in the panorama, the video module 208: (1) retrieves a pixel that also corresponds to the same point in the panorama from the image frame that is captured by matching camera module 103 at the particular time T=Ti; and (2) places the pixel from the image frame of the matching camera module 103 into the pixel location of the left panoramic image PIL,i.

Similarly, the video module 208 may construct a stream of right panoramic images from the image frames based on the right camera map by performing operations similar to those described above with reference to the construction of the stream of left panoramic images. For example, the video module 208 may identify matching camera modules 103 listed in the right camera map. The video module 208 may construct a first right panoramic image PIR,0 by stitching image frames that are captured by matching camera modules 103 at a first particular time T=T0. The video module 208 may construct a second right panoramic image PIR,1 by stitching image frames that are captured by the matching camera modules 103 at a second particular time T=T1, and so on and so forth. The video module 208 may construct the stream of right panoramic images to include the first right panoramic image PIR,0, the second right panoramic image PIR,1, and other constructed right panoramic images.

Specifically, for a pixel in a right panoramic image PIR, at a particular time T=Ti (i=0, 1, 2, . . . ), the video module 208: (1) identifies a matching camera module 103 from the right camera map; and (2) configures the pixel in the right panoramic image PIR, to be a corresponding pixel from an image frame that is captured by matching camera module 103 at the particular time T=Ti. The pixel in the right panoramic image PIR, and the corresponding pixel in the image frame of matching camera module 103 may correspond to the same point in the panorama.

In some embodiments, the video module 208 may construct pixels in a left or right panoramic image by blending pixels from image frames of multiple camera modules 103 according to weights associated with multiple camera modules 103.

In some embodiments, the left and right panoramic images may be optimized for stereoscopic viewing in a horizontal plane (e.g., yaw∈[0°, 360] and) pitch=0°. Alternatively or additionally, the left and right panoramic images may be optimized based on a user's viewing direction. For example, the video module 208 may adaptively construct the streams of left panoramic images and right panoramic images based on the user's current viewing direction. A panorama provided by the streams of left and right panoramic images may have a high-resolution in the user's current viewing direction and a low-resolution in a reverse viewing direction. This panorama may be referred to as a directional panorama. As the user rotates his or her head to view the panorama in a new viewing direction, the directional panorama may be adjusted to have a high resolution in the new viewing direction and a low resolution in a viewing direction opposite to the new viewing direction. Since only a directional panorama is constructed, bandwidth and other resources may be saved compared to constructing a full high-resolution panorama. However, quality of the 3D viewing experience is not affected if the user does not change viewing directions rapidly.

In some embodiments, a constructed left or right panoramic image may have color deficiencies. For example, since the lenses in camera modules 103 may point to different directions, light and color conditions may vary for the different lenses. Some image frames taken by some camera modules 103 may be over-exposed while some other image frames taken by other camera modules 103 may be under-exposed. The exposure or color deficiencies between image frames from different camera modules 103 may be corrected during a construction process of the left or right panoramic image.

Additionally or alternatively, due to the disparity between neighboring camera modules 103, a constructed left or right panoramic image may have stitching artifacts (or, stitching errors) where the viewpoint switches from a camera module 103 to a neighboring the camera module 103. Objects that are far away from camera modules 103 may have negligible disparity and there may be no stitching errors for the far-away objects. However, objects that are near camera modules 103 may have noticeable disparity and there may be stitching errors for the nearby objects.

The audio module 210 may comprise software including routines for generating a stream of 3D audio data configured to render 3D audio when played back on an audio reproduction device. The audio module 210 may be communicatively coupled to the bus 220 via signal line 230. The audio module 210 may generate the 3D audio data based on raw virtual reality audio data received from the microphone array 107. It is noted that the audio module 210 may generate the 3D audio data based on the raw virtual reality audio data received from different microphones systems (e.g., different makes and/or different microphone models) of one or more microphone arrays 107. In some embodiments, the audio module 210 may process the raw audio data to generate four-channel ambisonic audio tracks corresponding to raw virtual reality video data or rendered virtual video data. The audio module 210 may process the raw audio data to generate a virtual reality audio render.

The four-channel ambisonic audio tracks may provide a compelling 3D 360-degree audio experience to the user 134. In some embodiments, the four-channel audio tracks may be recorded in an "A" format by the microphone array 107 such as a Tetramic microphone. The audio module 210 may transform the "A" format four-channel audio tracks to a "B" format that includes four signals: W, X, Y, and Z. The W signal may represent a pressure signal that corresponds to an omnidirectional microphone, and the X, Y, Z signals may correspond to directional sounds in front-back, left-right, and up-down directions, respectively. In some embodiments, the "B" format signals may be played back in a number of modes including, but not limited to, mono, stereo, binaural, surround sound including four or more speakers, and any other modes. In some examples, an audio reproduction device may include a pair of headphones, and the binaural playback mode may be used for the sound playback in the pair of headphones. The audio module 210 may convolve the "B" format channels with Head Related Transfer Functions (HRTFs) to produce binaural audio with a compelling 3D listening experience for the user 134.

In some embodiments, the audio module 210 may generate 3D audio data that is configured to provide sound localization to be consistent with the user's head rotation. For example, if a sound is emanating from the user's right-hand side and the user rotates to face the sound, the audio reproduced during consumption of the virtual reality content sounds as if it is coming from in front of the user.

In some embodiments, the raw audio data is encoded with the directionality data that describes the directionality of the recorded sounds. The audio module 210 may analyze the directionality data to produce 3D audio data that changes the sound reproduced during playback based on the rotation of the user's head orientation. For example, the directionality of the sound may be rotated to match the angle of the user's head position. Assume that the virtual reality content depicts a forest with a canopy of tree limbs overhead. The audio for the virtual reality content includes the sound of a river. The directionality data indicates that the river is behind user 134, and so the 3D audio data generated by the audio module 210 is configured to reproduce audio during playback that makes the river sound as if it is located behind the user 134. This is an example of the 3D audio data being configured to reproduce directionality. Upon hearing the audio for the river, the user 134 may sense that the river is behind him or her. The 3D audio data is configured so that as the user 134 tilts his or her head to the side, the sound of the water changes. As the angle of the tilt approaches 180 degrees relative to the starting point, the river sounds as though it is in front of the user 134. This is an example of the 3D audio data being configured to reproduce directionality based on the angle of the user's 134 head position. The 3D audio data may be configured so that the sound of the river becomes more distinct and clearer, and the user 134 has a better sense of how far the water is from the user 134 and how fast the water is flowing.

The correction module 212 may comprise software including routines for detecting errors in raw virtual reality video data and raw virtual reality audio data. The correction module 212 is communicatively coupled to the bus 220 via a signal line 232. The errors may include calibration errors, exposure or color deficiencies, stitching errors, and other types of aberrations.

In some embodiments, calibration issues may result in two types of calibration errors: a first source that includes errors in measurement of physical properties of camera modules 103 (e.g., errors in spatial positions, rotations, focus, and focal lengths of the cameras) and a second source that includes mismatch between image measurement properties of the camera modules 103 (e.g., mismatch in brightness, contrast, and color).

The calibration errors may be removed through camera calibration. For example, objects with known colors, brightness, contrast, spatial orientations, and positions may be used to characterize each camera and adjust camera parameters (e.g., focus, sensor gain, white balance) prior to using the cameras to capture image frames. Alternatively or additionally, overlapping images between camera modules 103 may be analyzed, and image post-processing techniques may be used to adjust camera model parameters to reduce difference between the overlapping images.

In some embodiments, the correction module 212 may receive image frames captured by a camera module 103 and corrects the calibration errors on the image frames. For example, the correction module 212 may correct lens distortion (e.g., barrel or pin-cushion distortion) and camera orientation errors in the image frames based on lens distortion parameters, a position, and a rotational offset associated with a camera module 103.

In another example, the correction module 212 may analyze the image frames captured by a camera module 103, determine the calibration errors present in the image frames, and determine calibration factors used to calibrate the camera module 103. The calibration factors may include data used to automatically modify the image frames captured by the camera module 103 so that the image frames include fewer errors. In some embodiments, the calibration factors are applied to the image frames by the correction module 212 so that the image frames include no errors that are detectable during user consumption of the virtual reality content. For example, the correction module 212 may detect the deficiencies in the image frames caused by the calibration errors. The correction module 212 may determine one or more pixels associated with the deficiencies. The correction module 212 may determine the pixel values associated with these pixels and then modify the pixel values using the calibration factors so that the deficiencies are corrected. In some embodiments, the calibration factors may also be provided to a user device 142 who uses the calibration factors to manually correct the calibration deficiencies.

In some embodiments, the correction module 212 may detect and correct exposure or color deficiencies in the image frames captured by the camera array 101. For example, the correction module 212 may determine one or more pixels associated with the exposure or color deficiencies. The correction module 212 may determine the pixel values associated with these pixels and then modify the pixel values so that the exposure or color deficiencies are not detectable by a user during consumption of the virtual reality content using a viewing system 133. In some embodiments, camera modules 103 may have overlapping fields of view, and exposure or color deficiencies in the image frames captured by the camera modules 103 may be corrected or auto-corrected using this overlap. In other embodiments, exposure or color deficiencies in the image frames captured by the camera modules 103 may be corrected using calibration based on color charts of known values.

The stitching errors may be made by video module 208 when stitching image frames from various camera modules 103 of the camera array 101 to form a left or right panoramic image. The stitching errors may include stitching artifacts, parallax errors, stitching of shared features, color errors, horizon line errors, synchronization errors, and errors caused by close-by objects.

Stitching artifacts include errors at the stitching boundaries between image frames or ghosting, which is when the image includes something that should not be present, such as a white haze in a part of the image. Parallax errors result from matching features in images based on their distance to the camera. The stitching of shared features may result from two images being stitched together based on identifying common features (e.g., common objects) in each of the images and using the common features as a guide for stitching. However, the stitching may fail if the images do not have enough common features. Color errors include mistakes in either the color of an entire initial virtual reality render or when certain image frames have a wrong color, for example, if the camera module 103 generating corresponding image frames captured too much sun, was in a shadow, etc. Horizon line errors may result after stitching image frames because the horizon line may be displayed at an odd angle, such as a slant. Synchronization errors result from stitching image frames that are out of sync.

In some embodiments, the correction module 212 may correct stitching errors caused by close-by objects. For example, the closer an object is to the camera array 101, the greater the difference of a viewing angle from each camera module 103 to the object. Close-by objects that cross a stitching boundary may abruptly transition between viewing angles and may thus produce an obvious visual discontinuity. This may be referred to herein as the "close object problem." Stitching errors may be incurred for close-by objects. One example mechanism to reduce the stitching errors may include increasing the number of camera modules 103 of the camera array 101 distributed throughout a spherical housing case of the camera array 101 to approach an ideal of a single, continuous, and spherical image sensor. The mechanism may reduce the viewing angle discrepancy between neighboring cameras and may thus reduce the stitching artifacts. Alternatively, virtual cameras may be interpolated between real cameras to simulate an increasing camera density so that stitching artifacts may be reduced. Image stitching using virtual cameras is described in more detail in U.S. application Ser. No. 14/465,581, titled "Image Stitching" and filed Aug. 21, 2014, which is incorporated herein in its entirety by reference.

The correction module 212 may analyze the image frames or the panoramic images to identify the stitching errors. The correction module 212 may process the image frames or panoramic images to mask or correct the stitching errors. In some embodiments, the correction module 212 includes editing tools. The editing tools may be used to automatically analyze the initial virtual reality video renders for errors, for example stitching errors. In some embodiments, the editing tools may also be used to edit the virtual reality video renders to remove the stitching errors. In some embodiments, the editing tools may include video editing tools and audio editing tools. In other embodiments, the editing tools may include options other than video editing tools and audio editing tools.

In some embodiments, the correction module 212 instructs the user interface module 216 to generate a graphical data for displaying a user interface for providing access to an initial virtual reality render, recording, and/or segment on a web viewing device 141, a user device 142, or a console 144. For example, a user 134 may edit a video using various video editing tools and/or edit audio using various audio editing tools. Any type of digital video and/or digital audio editing tools may be used. A user 134 may request a specific render, recording, or segment from the virtual reality application 104 through the network 105. A copy of the specific render, recording, or segment may be pushed to the viewing system 133 from the virtual reality processing server 115 in response to the request. In some embodiments, as part of the request, the user 134 may submit a user identification (e.g., a user name), a password, and/or other credentials allowing the user 134 to access the render, recording, and/or segment. In some embodiments, the user 134 may request the render, recording, and/or segment by file name, by project name, by render name, by segment name, by recording name, by video frame number, by time, by location, by a time period, by a video frame range, etc.

In embodiments where the render, recording, or segment is received by a web viewing device 141, the user 134 may access a browser on a webpage that provides the editing tools, such as the video editing tools or audio editing tools. In embodiments where the render, recording, or segment is received by a user device 142 or a console 144, the user device 142 or the console 144 may store the editing tools, such as the video editing tools or audio editing tools.

After editing the render, recording, and/or segment the user 134 may submit, via the viewing system 133, the edited render, recording, and/or segment to the correction module 212. The correction module 212 may retrieve or receive the edited render, recording, and/or segment and store the edited render, recording, and/or segment in the datastore 120 as another version of the render, recording, and/or segment. In some embodiments, the correction module 212 receives corrections or a corrected virtual reality render from the viewing system 133.

In some embodiments, the correction module 212 may correct the raw virtual reality data and instruct the video module 208 to generate a corrected virtual reality render to replace an initial virtual reality render. The correction module 212 may reanalyze the corrected virtual reality render to determine if the corrected virtual reality render includes stitching errors.

In some embodiments, the correction module 212 uses a stitching algorithm to stitch the images frames. The correction module 212 may use machine learning to implement the stitching algorithm. Stitching of the initial virtual reality render may be corrected by providing corrections (e.g., feedback) to the stitching algorithm, where the feedback may be sent from the viewing system 133 (e.g., the web viewing device 141, the user device 142, or the console) to the correction module 212. In some embodiments, the stitching algorithm may be re-implemented on the raw virtual reality video data, upon receiving the feedback, so as to generate a new corrected virtual reality render with reduced and/or no stitching errors.

In some embodiments, the machine learning uses the feedback to improve the stitching algorithm. In some embodiments, the correction module 212 determines whether the stitching errors determined by the correction module 212 match the correction received from the viewing system 133. For example, a user 134 may identify a stitching error that was not detected by the correction module 212. The correction module 212 may modify the stitching algorithm to detect future instances of stitching errors that are similar to the stitching error identified by the user 134. The correction module 212 may implement machine learning to improve the stitching algorithm based on the correction from the viewing system 133.

The combination module 214 may comprise software including routines for combining 3D video data and 3D audio data to generate virtual reality content. The combination module 214 may be communicatively coupled to the bus 220 via signal line 234. The 3D video data may include left panoramic images for left eye viewing and right panoramic images for right eye viewing. Redundancy may exist between the left panoramic images and the right panoramic images.

The combination module 214 may compress the left panoramic images and the right panoramic images to generate compressed 3D video data using video compression techniques. In some embodiments, within each of the left or right panoramic images, the combination module 214 may use redundant information from one frame to a next frame to reduce the size of the corresponding video. For example, with reference to a first image frame (e.g., a reference frame), redundant information in the next image frames may be removed to reduce the size of the next image frames. This compression may be referred to as temporal or inter-frame compression within the same left or right panoramic images.

Alternatively or additionally, the combination module 214 may use one set of images (either the left panoramic images or the right panoramic images) as a reference and may compress the other based on the reference. For example, the combination module 214 may use each left panoramic image as a reference frame for a corresponding right panoramic image and may compress the corresponding right panoramic image based on the referenced left panoramic image.

In some embodiments, the combination module 214 may encode the 3D video data (or compressed 3D video data) and/or 3D audio data to form a VR content. For example, the combination module 214 may compress the 3D video data using H.264 and the 3D audio data using advanced audio coding (AAC). In another example, the combination module 214 may compress the 3D video data and the 3D audio data using a standard MPEG format. The virtual reality content may be constructed by the combination module 214 using any combination of the 3D video data (or the compressed 3D video data), the 3D audio data (or the compressed 3D audio data), content data from a content server, an advertisement data from ad server, social data from social network server, and/or any other suitable video, audio, or virtual reality content.

In some embodiments, the virtual reality content may be packaged in a container format such as MP4, WebM, VP8, and any other suitable format.

The user interface module 216 may comprise software including routines for generating graphical data for displaying a user interface. The user interface module 216 may be communicatively coupled to the bus 220 via signal line 236.

In some embodiments, the user interface module 216 generates graphical data for displaying a user interface for a user 134 to identify corrections in initial virtual reality data renders and/or to generate corrected virtual reality data renders. The user interface module 216 may generate the graphical data for displaying the user interface and transmit it, via the communication unit 245, to the web viewing device 141, the user device 142, or the console 144.

The user interface may include an option for providing feedback by clicking on a location of a stitching error within the initial virtual reality render. The user device may provide the initial virtual reality render with the feedback or extract information about the feedback, such as a time and a location in the initial virtual reality render where the stitching error occurs. The viewing system 133 may transmit the correction (such as feedback) and/or a corrected virtual reality video render to the correction module 212.

Example Methods

Figure 3:
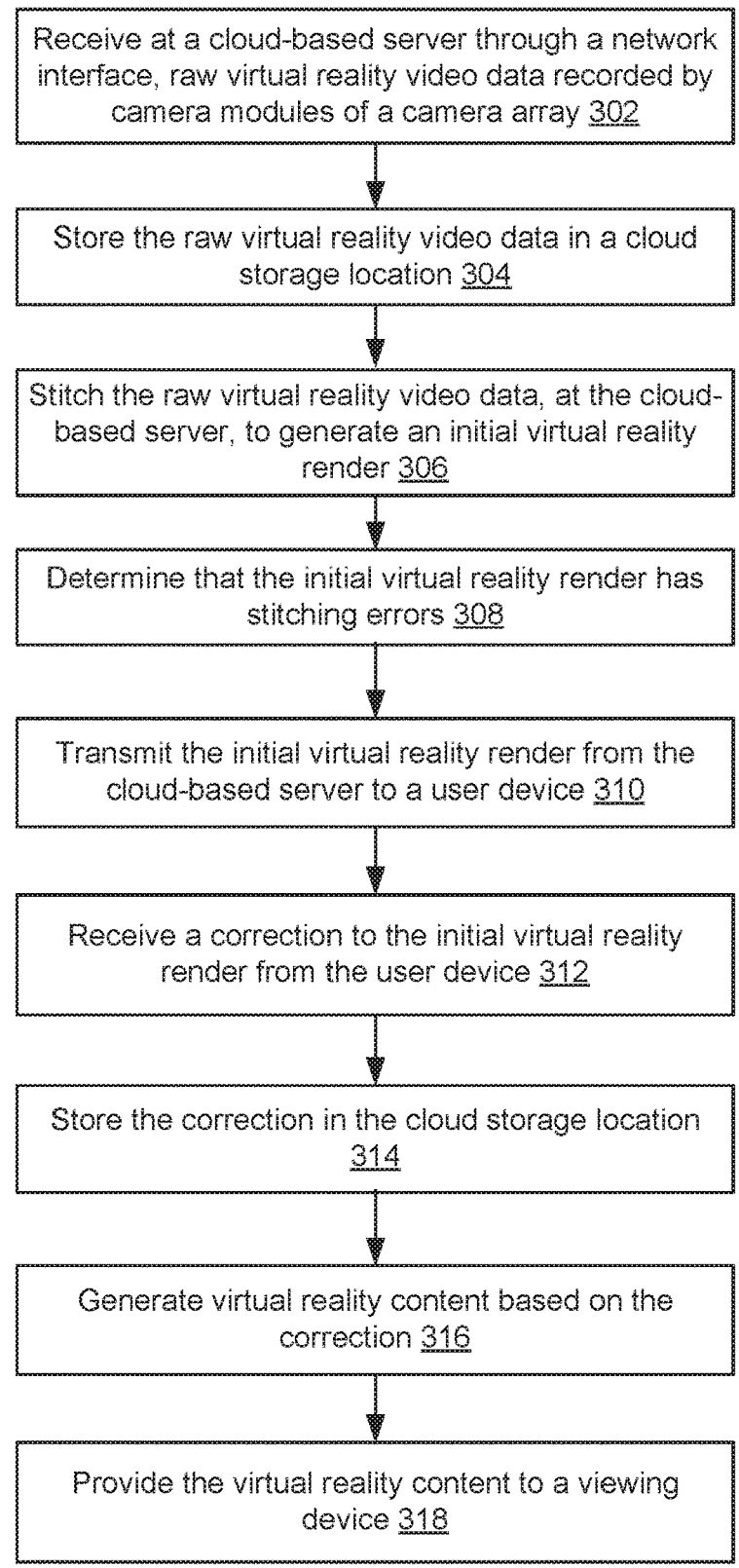
FIG. 3 is a flowchart of an example method of stitching corrections of an initial virtual reality video render in a user device according to some embodiments.

FIG. 3 is a flowchart of an example method 300 of stitching corrections of an initial virtual reality video render in a user device according to some embodiments. One or more steps of the method 300 may be implemented, in some embodiments, by one or more components of the virtual reality system 100 of FIG. 1. Although illustrated as discrete blocks, various blocks may be divided into additional blocks, combined into fewer blocks, or eliminated, depending on the desired implementation.

At block 302, raw virtual video data is received at a cloud-based server through a network interface. The raw virtual reality data is recorded by the camera modules 103 of the camera array 101. The camera array 101 may include, for example, Jaunt One™, Ricoh Theta, Bublcam, Nokia OZO, Giroptic, Freedom 360 GoPro Mount, V.360, etc. In some embodiments, audio data may also be received at the cloud-based server. The raw virtual video data may be received by the virtual reality application 104 stored on the virtual reality processing server 115 and the network interface may be the network 105 as described in FIG. 1.

At block 304, the raw virtual reality video data is stored in a cloud storage location. In some embodiments, the raw virtual reality data may be stored and operated across multiple servers, while in some embodiments, the raw virtual reality data may be operated by a single server. For example, the raw virtual reality video data may be stored as virtual reality data 126 in the datastore 120 that is part of the virtual reality processing server 115. In some embodiments, the cloud storage may include, for example, a personal cloud storage, a public cloud storage, a private cloud storage, or a hybrid cloud storage.

At block 306, the raw virtual reality data is stitched together, at the cloud-based server, to generate an initial virtual reality render. In some embodiments, the virtual reality application 104 may process the raw virtual reality data and perform the stitching. In some embodiments, the stitching may be performed using a stitching algorithm that the virtual reality application is programmed to implement. In some embodiments, the stitching may involve a first panel displaying the received raw virtual reality data, a second panel displaying a preview of the stitched virtual reality render, and a third panel to process the stitched virtual reality render to detect errors and/or manage other settings.

At block 308, it is determined that the initial virtual reality render has stitching errors. In some embodiments, the virtual reality application 104 may analyze the initial virtual reality render to detect the stitching errors. In some other embodiments, a separate application or an editing tool, such as video editing tools or audio editing tools, within the cloud that may perform the analyzing of the initial virtual reality render to detect errors, while in other embodiments, an application or an editing tool in a user device may be used to analyze the initial virtual reality render and detect errors. In some embodiments, the user device may include or correspond to the viewing system 133, for example, the web viewing device 141, the user device 142, the virtual reality device 143 and/or the console 144, as described in FIG. 1.

At block 310, the initial virtual reality render is transmitted from the cloud-based server to a user device through the network 105. In some embodiments, the initial virtual reality render with stitching errors may be downloaded from the cloud-based server into the user device through the network 105. In some embodiments, a user may use an application or an editing tool in the user device to download the initial virtual reality render. In some embodiments, the initial virtual reality render may be downloaded into the user device by the press of a button or by a user clicking on a link.

At block 312, a correction to the initial virtual reality render is received from the user device. For example, the cloud-based server receives feedback from the user device identifying a type of stitching error (e.g., stitching artifacts, color deficiencies, parallax errors, stitching of shared features, horizon line errors, etc.) and a location in the initial virtual reality render where each stitching error occurs. The correction is received at the cloud-based server, through the network 105. In some embodiments, the correction to the initial virtual reality render may include removing and/or correcting the stitching errors. In some embodiments, the user device generates a corrected virtual reality render that corrects the stitching errors.

In some embodiments, an application or an editing tool within the user device may be used by the user to edit the initial virtual reality render to correct the stitching errors. In some embodiments, the application or the editing tool within the user device may be used to re-evaluate the corrected virtual reality render for more errors, including stitching errors.

In some embodiments, the stitching of the initial virtual reality render may be corrected by providing feedback to the stitching algorithm, where the feedback may be sent from the user device to the cloud-based server. In some embodiments, the stitching algorithm may be re-implemented on the raw virtual reality video data, upon receiving the feedback so as to generate a new corrected virtual reality render with reduced and/or no stitching errors. In some embodiments, the cloud-based server may process the corrected virtual reality render to generate a final virtual reality render with the modified and/or corrected stitches.

At block 314, the correction is stored in the cloud storage location. For example, the corrected virtual reality render is stored as virtual reality data 126 in the datastore 120. In some embodiments, the corrected virtual reality render is operated and stored over multiple servers or may be operated by a single server.

At block 316, virtual reality content is generated based on the correction. For example, the virtual reality content is generated from a corrected virtual reality render. The virtual reality content may be generated in any format, for example, mp4, MPEG, H.264, MOV, F4V, Webm, 3D panoramic, etc. in 2K, 4K etc. resolutions.

At block 318, the virtual reality content is provided to a viewing system 133. For example, the virtual reality content may be made available for download through a network interface, so that the virtual reality content can be downloaded into other devices, viewed on websites, etc.

Figure 4:
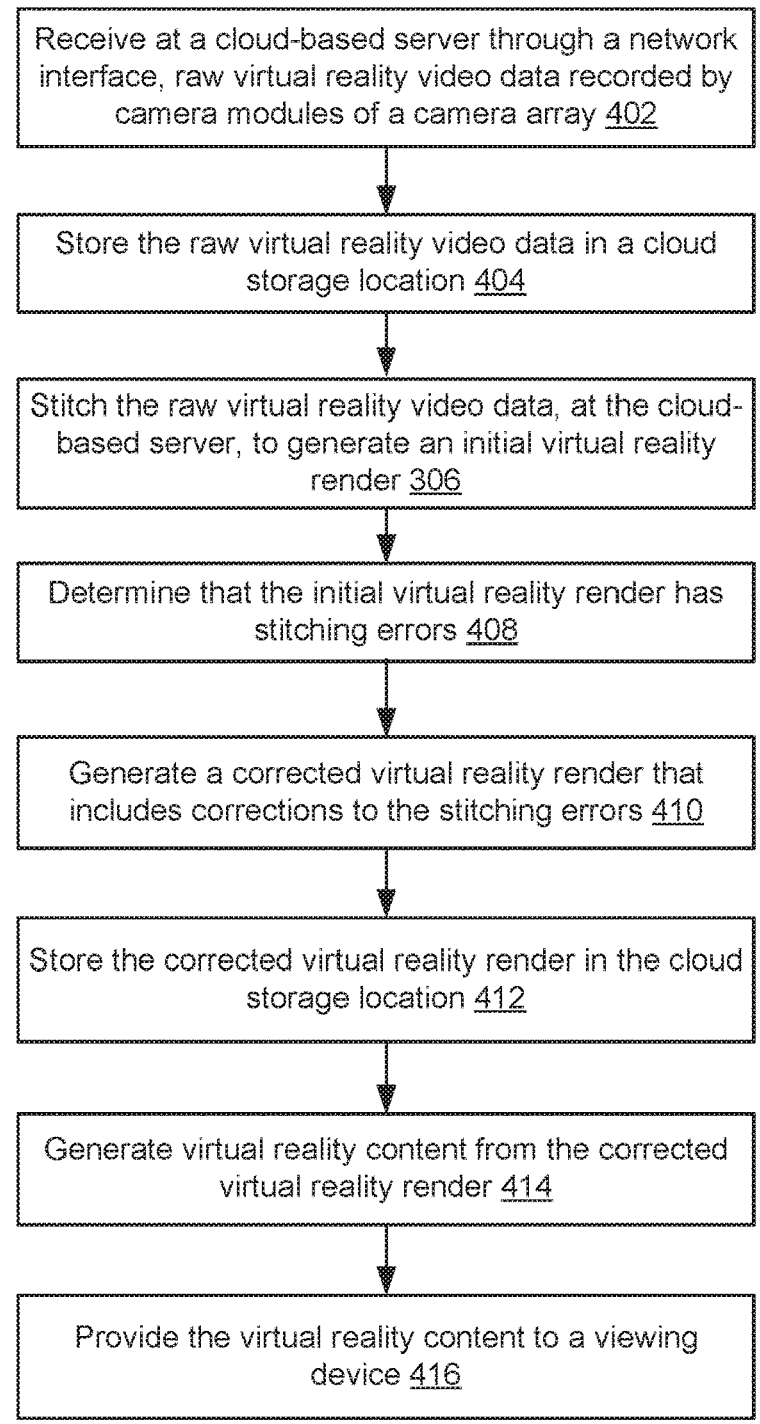
FIG. 4 is a flowchart of an example method of stitching corrections of an initial virtual reality video render in a cloud-based virtual reality processing system according to some embodiments.

FIG. 4 is a flowchart of an example method 400 of stitching corrections of an initial virtual reality video render in a cloud-based virtual reality processing system according to some embodiments. One or more steps of the may 400 may be implemented, in some embodiments, by one or more components of the virtual reality system 100 of FIG. 1. Although illustrated as discrete blocks, various blocks may be divided into additional blocks, combined into fewer blocks, or eliminated, depending on the desired implementation.

At block 402, raw virtual video data is received at a cloud-based server through a network interface. The raw virtual reality data is recorded by the camera modules 103 of the camera array 101. The camera array 101 may include, for example, Jaunt One™, Ricoh Theta, Bublcam, Nokia OZO, Giroptic, Freedom 360. GoPro Mount, V.360, etc. In some embodiments, audio data may also be received at the cloud-based server. The raw virtual video data may be received by the virtual reality application 104 stored on the virtual reality processing server 115 and the network interface may be the network 105 as described in FIG. 1.

At block 404, the raw virtual reality video data is stored in a cloud storage location. In some embodiments, the raw virtual reality data may be stored and operated across multiple servers, while in some embodiments, the raw virtual reality data may be operated by a single server. For example, the raw virtual reality video data may be stored as virtual reality data 126 in the datastore 120 that is part of the virtual reality processing server 115. In some embodiments, the cloud storage may include, for example, a personal cloud storage, a public cloud storage, a private cloud storage, or a hybrid cloud storage.

At block 406, the raw virtual reality data is stitched together, at the cloud-based server, to generate an initial virtual reality render. In some embodiments, the virtual reality application 104 may process the raw virtual reality data and perform the stitching. In some embodiments, the stitching may be performed using a stitching algorithm that the virtual reality application is programmed to implement. In some embodiments, the stitching may involve a first panel displaying the received raw virtual reality data, a second panel displaying a preview of the stitched virtual reality render, and a third panel to process the stitched virtual reality render to detect errors and/or manage other settings.

At block 408, it is determined that the initial virtual reality render has stitching errors. In some embodiments, the virtual reality application 104 may analyze the initial virtual reality render to detect the stitching errors. For example, the correction module 212 may determine the stitching errors. In some other embodiments, a separate application or an editing tool within the cloud may perform the analyzing of the initial virtual reality render to detect errors. In some embodiments, a third-party editing tool that is connected to the virtual reality processing server 115 via the network 105 corrects the stitching errors.

At block 410, a corrected virtual reality render is generated that includes corrections to the stitching errors. In some embodiments, the virtual reality application 104 generates the corrected virtual reality render. For example, the correction module 212 may correct the stitching errors. In some embodiments, an editing application and/or an editing tool within the cloud, may be used to edit the virtual reality renders to correct the stitching errors of the initial virtual reality render. In some embodiments, the editing may occur automatically. In some embodiments, the stitching of the initial virtual reality render may be corrected by providing feedback to the stitching algorithm, where the feedback may be sent from the editing application and/or the editing tool to the virtual reality processing server 115 within the cloud. In some embodiments, the stitching algorithm may be re-implemented on the raw virtual reality video data, upon receiving the feedback, so as to generate a new corrected virtual reality render with reduced or no stitching errors. In some embodiments, the virtual reality processing server 115 may process the corrected virtual reality render to generate a final virtual reality render with the corrected and/or modified stitches. In some embodiments, the corrected virtual reality render is re-analyzed by an editing tool, to detect more errors, including stitching errors.

At block 412, the corrected virtual reality render is stored in the cloud storage location. For example, the corrected virtual reality render is stored as virtual reality data 126 in the datastore 120. In some embodiments, the corrected virtual reality render is operated and stored over multiple servers or may be operated by a single server.

At block 414, virtual reality content is generated from the corrected virtual reality render. The virtual reality content may be generated in any format, for example, mp4, MPEG, H.264, MOV, F4V, Webm, 3D panoramic, etc. in 2K, 4K etc. resolutions.

At block 416, the virtual reality content is provided to a viewing system 133. For example, the virtual reality content may be made available for download through a network interface, so that the virtual reality content can be downloaded into other devices, viewed on websites, etc.

Example Generation of Virtual Reality Content

Figure 5:
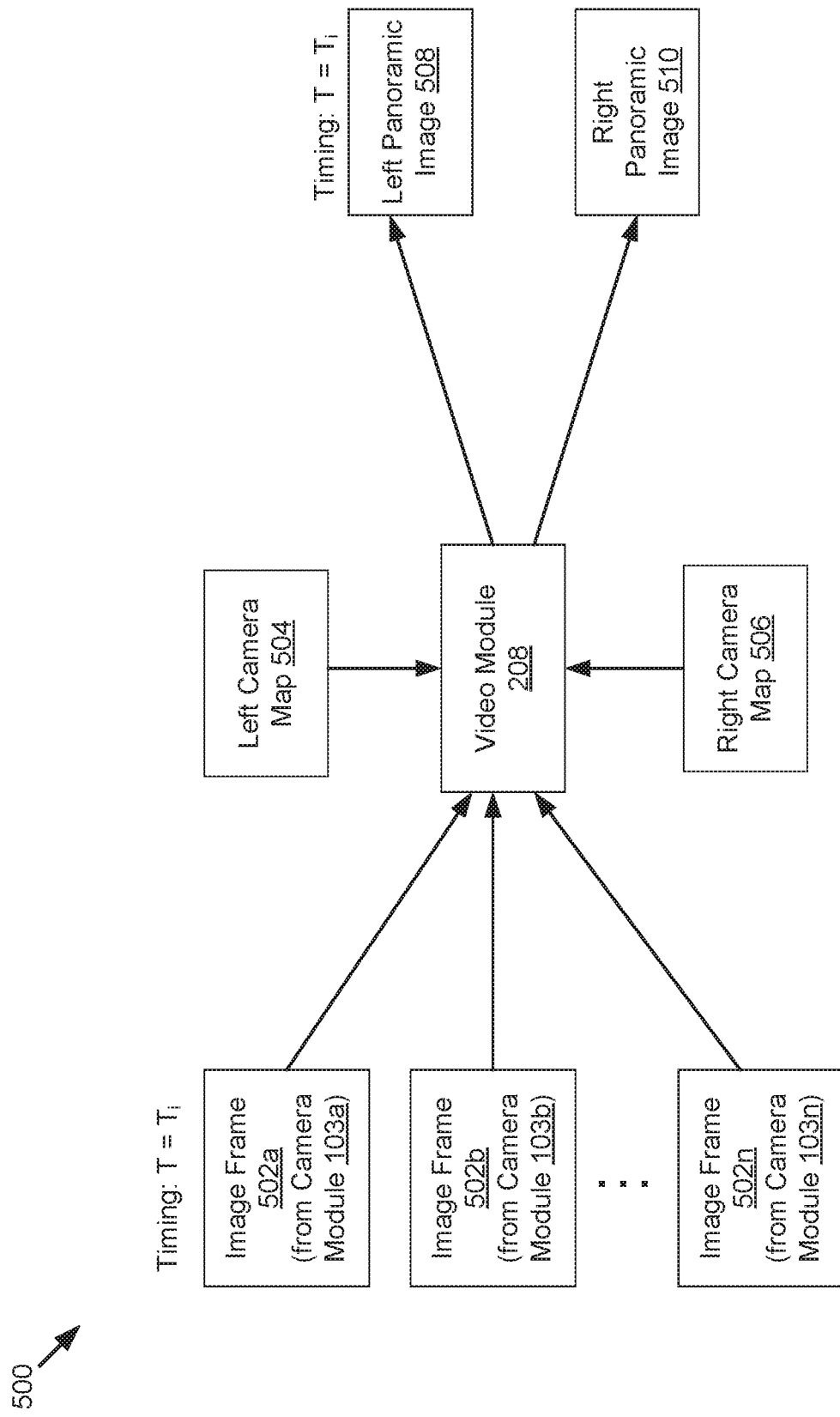
FIG. 5 illustrates an example process of generating a left panoramic image and a right panoramic image from multiple image frames that are captured by multiple camera modules at a particular time.

FIG. 5 illustrates an example process 500 of generating a left panoramic image and a right panoramic image from multiple image frames that are captured by multiple camera modules 103A, 1038, 103N at a particular time, arranged in accordance with at least some embodiments described herein. At the particular time T=Ti (i=0, 1, 2, . . . ), the camera module 103A captures an image frame 502 a, the camera module 1038 captures an image frame 502 b, and the camera module 103N captures an image frame 502 n. The video module 208 receives image frames 502 a, 502 b, and 502 n. The video module 208 aggregates image frames 502 a, 502 b, and 502 n to generate a left panoramic image 508 based on a left camera map 504 and a right panoramic image 510 based on a right camera map 506. Left panoramic image 508 and right panoramic image 510 are associated with the particular time T=Ti.

FIG. 6A is a graphic representation 600 illustrating an example panoramic image, arranged in accordance with at least some embodiments described herein. The panoramic image has a first axis "yaw" which represents rotation in a horizontal plane and a second axis "pitch" which represents up and down rotation in a vertical direction. The panoramic image covers an entire 360-degree sphere of a scene panorama. A pixel at a position [yaw, pitch] in the panoramic image represents a point in a panorama viewed with a head rotation having a "yaw" value and a "pitch" value. Thus, the panoramic image includes a blended view from various head rotations rather than a single view of the scene from a single head position.

FIG. 6B is a graphic representation 650 illustrating an example camera map, arranged in accordance with at least some embodiments described herein. The example camera map matches first pixels in camera sections 652 a and 652 b of a panoramic image to a first matching camera module 103, second pixels in a camera section 654 to a second matching camera module 103, and third pixels in camera sections 656 a and 656 b to a third matching camera module 103. For the first pixels of the panoramic image within camera sections 652 a and 652 b, values for the first pixels may be configured to be corresponding pixel values in a first image frame captured by first matching camera module 103. Similarly, for the second pixels of the panoramic image within camera section 654, values for the second pixels may be configured to be corresponding pixel values in a second image frame captured by second matching camera module 103. For the third pixels of the panoramic image within camera sections 656 a and 656 b, values for the third pixels may be configured to be corresponding pixel values in a third image frame captured by third matching camera module 103. In this example, the panoramic image is stitched using part of the first image frame from first matching camera module 103, part of the second image frame from second matching camera module 103, part of the third image frame from third matching camera module 103, and part of other image frames from other matching camera modules 103.

Figure 7A:
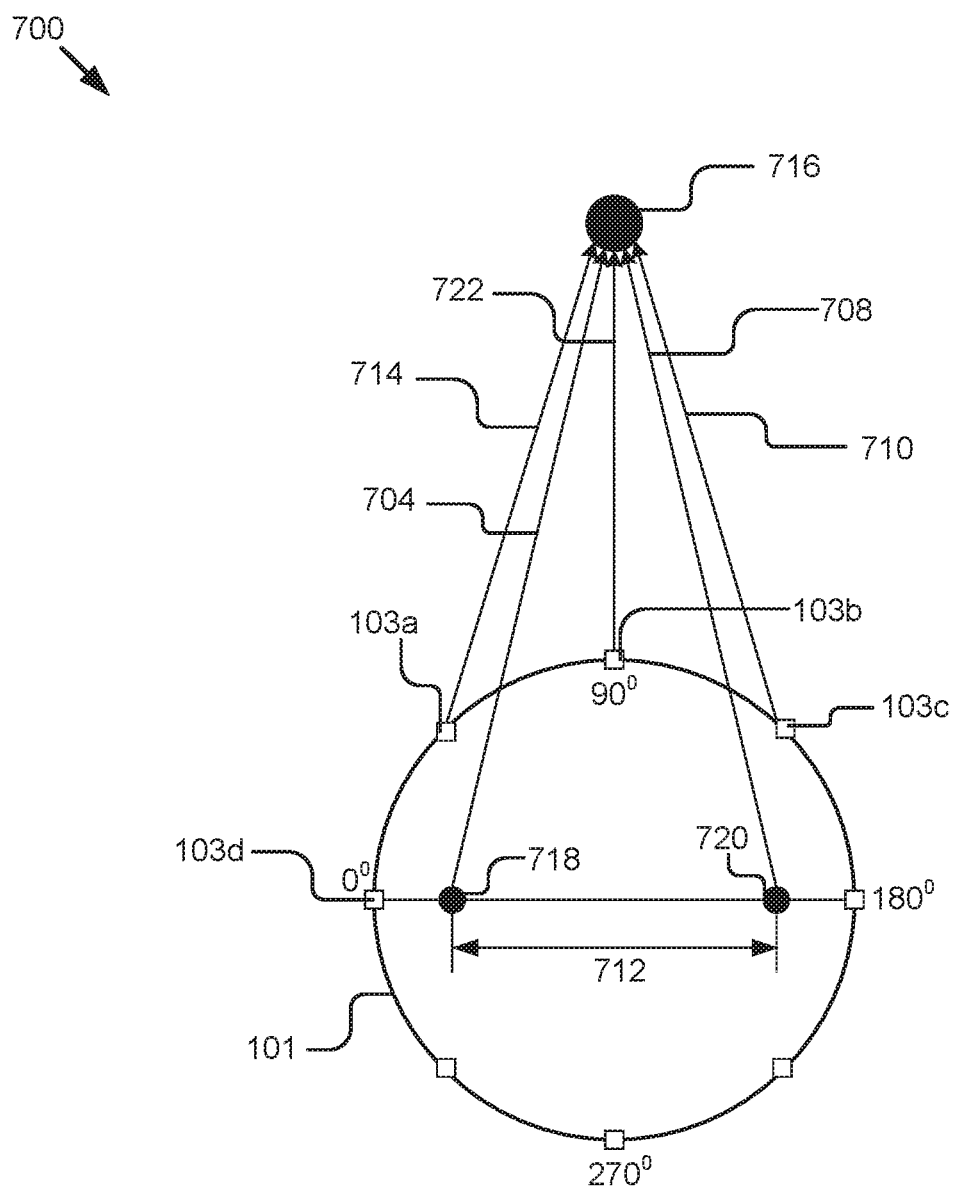
FIGS. 7A and 7B are graphic representations that illustrate example processes of selecting a first camera module for a pixel in a left panoramic image to construct a left camera map and selecting a second camera module for the pixel in a right panoramic image to construct a right camera map.
Figure 7B:
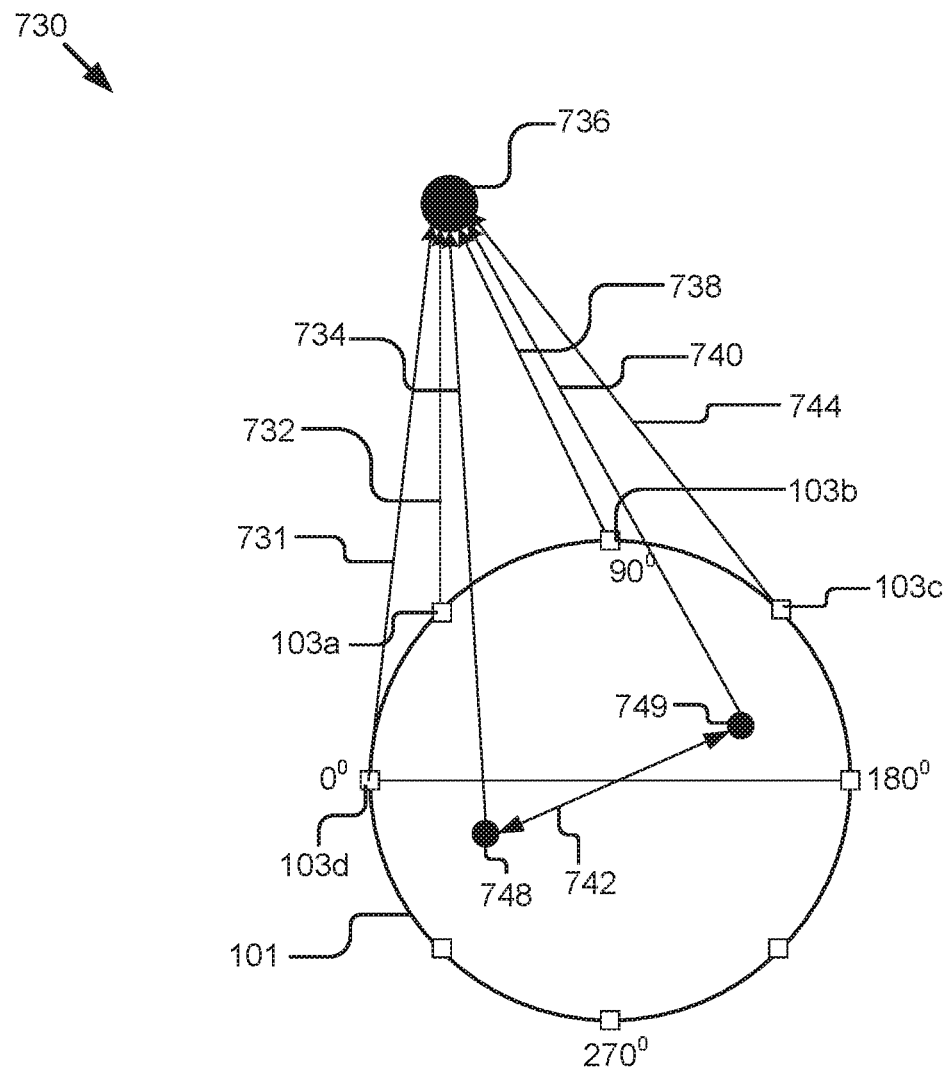

FIGS. 7A and 7B are graphic representations 700 and 730 that illustrate example processes of selecting matching camera modules 103 for a pixel in a left and a right panoramic images, arranged in accordance with at least some embodiments described herein. Referring to FIG. 7A, the camera array 101 includes camera modules 103A, 103B, 103C, 103D and other camera modules mounted on a spherical housing. Assume that a point 716 corresponds to a head rotation position with yaw=80° and pitch=0°. An interocular distance 712 is illustrated between a left eye position 718 and a right eye position 720. Since pitch=0°, interocular distance 712 is at its maximum value. Left eye position 718 and right eye position 720 may be determined by: (1) drawing a first line from point 716 to a center of the camera array 101; (2) determining an interocular distance based on a current pitch value; (3) drawing a second line that is perpendicular to the first line and also parallel to a plane with yaw=[0°, 360° ] and pitch=0°, where the second line has a length equal to the determined interocular distance and is centered at the center of the camera array 101; and (4) configuring a left end point of the second line as left eye position 718 and a right end point of the second line as right eye position 720.

A left viewing direction 704 from left eye position 718 to point 716 and a right viewing direction 708 from right eye position 720 to point 716 are illustrated in FIG. 7A. Camera modules 103A, 103B, and 103C have viewing directions 714, 722, 710 to point 716, respectively.

Since viewing direction 714 of the camera module 103A is more parallel to left viewing direction 704 compared to other viewing directions 722 and 710 (e.g., an angle between viewing direction 714 and left viewing direction 704 is smaller than angles between left viewing direction 704 and other viewing directions 722 and 710), the camera module 103A is selected as a matching camera module that has a better view for point 716 than other camera modules in a left camera map. Since viewing direction 710 of the camera module 103C is more parallel to right viewing direction 708 compared to other viewing directions 722 and 714, the camera module 103C is selected as a matching camera module that has a better view for point 716 than other camera modules in a right camera map.

Referring to FIG. 7B, assume that a point 736 in a panorama corresponds to a head rotation position with yaw=80° and pitch=0°. An interocular distance 742 is illustrated between a left eye position 748 and a right eye position 749. A left viewing direction 734 from left eye position 748 to point 736 and a right viewing direction 740 from right eye position 749 to point 736 are illustrated in FIG. 7B. Camera modules 103A, 103B, 103C, and 103D have viewing directions 732, 738, 744, 731 to point 736, respectively. Since viewing direction 732 of the camera module 103A is more parallel to left viewing direction 734 compared to other viewing directions 738, 744, 731, the camera module 103A is selected as a matching camera module that has a better view for point 736 in a left camera map. Since viewing direction 738 of the camera module 103B is more parallel to right viewing direction 740 compared to other viewing directions 731, 734, 744, the camera module 103B is selected as a matching camera module that has a better view for point 736 in a right camera map.

In some embodiments, operations to determine a matching camera module for point 736 in a left panoramic image for left eye viewing may be summarized as follows: (1) determining a set of camera modules that have point 736 in their respective fields of view; (2) determining left viewing direction 734 from left eye position 748 to point 736; (3) determining a set of viewing directions to point 736 for the set of camera modules; (4) selecting viewing direction 732 from the set of viewing directions, where viewing direction 732 forms a smallest angle with left viewing direction 734 compared to angles formed between left viewing direction 734 and other viewing directions in the set (in other words, viewing direction 732 being more parallel to left viewing direction 734 than other viewing directions); and (5) configuring a matching camera module for point 736 as the camera module 103A that has viewing direction 732. Some other cost functions for determining the matching camera module for point 736 in the left panoramic image are possible as long as the cost functions may define some notion of best approximation to the view from left eye position 748.

Similarly, operations to determine a matching camera module for point 736 in a right panoramic image for right eye viewing may be summarized as the following: (1) determining the set of camera modules that have point 736 in their respective fields of view; (2) determining right viewing direction 740 from right eye position 749 to point 736; (3) determining the set of viewing directions to point 736 for the set of camera modules; (4) selecting viewing direction 738 from the set of viewing directions, where viewing direction 738 forms a smallest angle with right viewing direction 740 compared to angles formed between right viewing direction 740 and other viewing directions in the set; and (5) configuring a matching camera module for point 736 as the camera module 103B that has viewing direction 738. Some other cost functions for determining the matching camera module for point 736 in the right panoramic image are possible as long as the cost functions may define some notion of best approximation to the view from right eye position 749.

Figure 8:
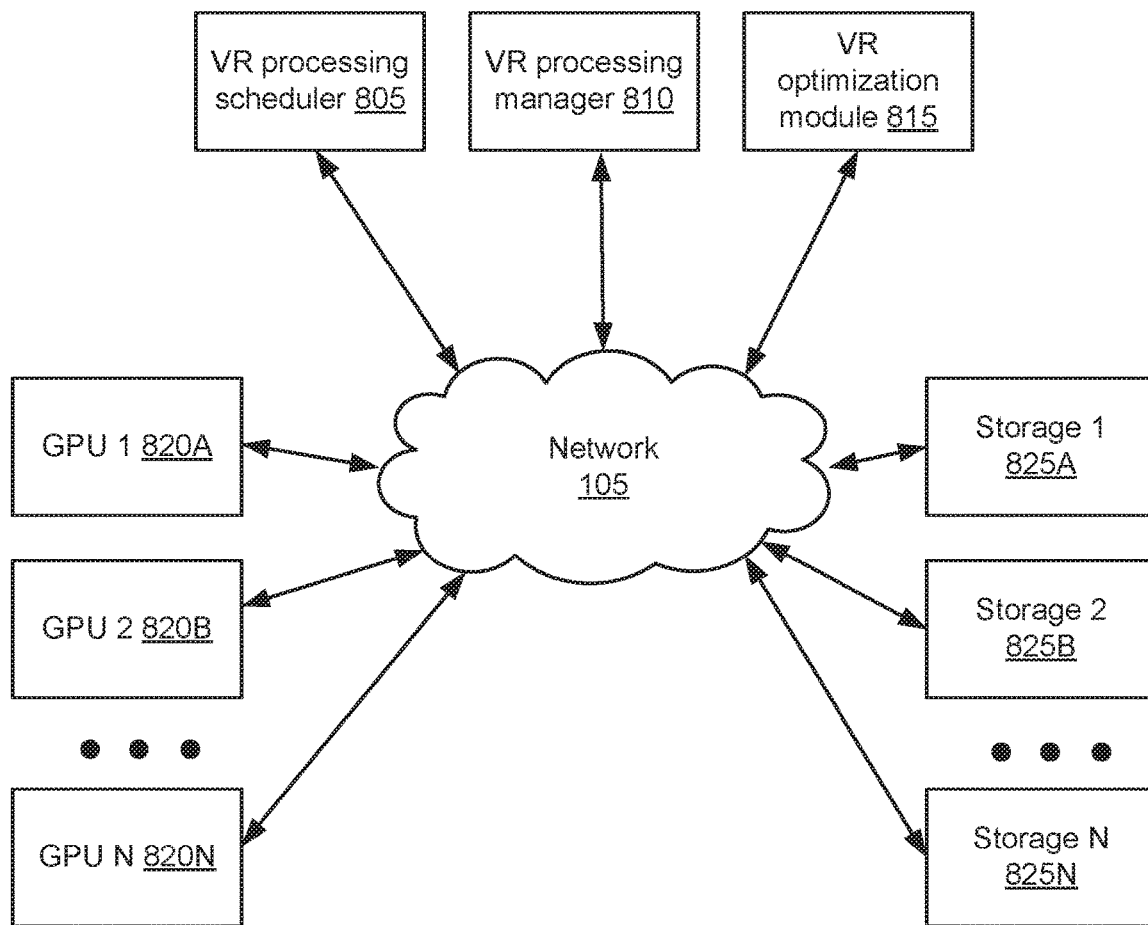
FIG. 8 is a block diagram of a distributed virtual reality processing server according to some embodiments.

FIG. 8 is a block diagram of a distributed virtual reality processing system 800 according to some embodiments. The distributed virtual reality processing system 800 may represent on or more components of the virtual reality system 100 in FIG. 1 and/or the datastore 120 in FIG. 1.

In FIG. 8 the virtual reality processing system 800 includes a virtual reality processing scheduler 805, a virtual reality processing manager 810, a virtual reality optimization module 815, a graphical processing unit (GPU) 1 820A, a graphical processing unit 2 820 B, a graphical processing unit N 820N, storage 1 825A, storage 2 825B, and storage N 825N. In some embodiments, the graphical processing units 820 and the storage 825 are referred to as virtual reality resources.

While three graphical processing units 820 are shown, any number may be used. In some embodiments, a graphical processing unit 820 may be a server or a node on a server. In some embodiments, a graphical processing unit 820 may be a cloud-based server. In some embodiments, a graphical processing unit 820 may be a third-party server that is accessed across the cloud. In some embodiments, a graphical processing unit 820 may be a server virtual server. In some embodiments, a graphical processing unit 820 may be a server of a plurality of servers distributed across the network 105. In some embodiments, a graphical processing unit 820 may execute one or more processes or portions of one or more processes described as part of this description or incorporated into this description in order to create a virtual reality render or a virtual reality video.

The virtual reality processing system 800 includes storage 825 such as, for example, virtual reality cloud storage. While three storage 825 locations are shown, any number may be used. In some embodiments, storage 825 may be part of or may comprise the virtual reality datastore 120. In some embodiments, the storage 825 may be a server or node on a server. In some embodiments, a virtual reality cloud storage location 825 may be a cloud-based server. In some embodiments, storage 825 may be a third-party server that is accessed across the cloud. In some embodiments, storage 825 may be a server virtual server. In some embodiments, storage 825 may be a server of a plurality of servers distributed across the network 105. In some embodiments, storage 825 may be used to store all or parts of the raw virtual reality video data, virtual reality video data, the virtual reality render, the virtual reality content, and/or the virtual reality data 126 prior to or during processing of the virtual reality render.

In some embodiments, the virtual reality processing scheduler 805, the virtual reality processing manager 810, and/or the virtual reality optimization module 815 include code that is executed or performed on a single server. In some embodiments, the virtual reality processing scheduler 805, the virtual reality processing manager 810, and/or the virtual reality optimization module 815 include code that is executed or performed on one or more of a plurality of servers. In some embodiments, the virtual reality processing scheduler 805, the virtual reality processing manager 810, and the virtual reality optimization module 815 are each executed or performed on unique and separate servers.

In some embodiments, the virtual reality processing scheduler 805 schedules a virtual reality rendering project for processing raw virtual reality video data to generate virtual reality renders across a plurality of distributed virtual reality processing resources. In some embodiments, the virtual reality processing scheduler 805 creates a virtual reality processing map that specifies the virtual reality processing jobs or tasks to be completed by one or more virtual reality processing resources. The virtual reality processing resources are illustrated in FIG. 8 as being graphical processing units 820 and storage 825, but other virtual reality processing resources may be used. In some embodiments, the virtual reality processing scheduler 805 parses the raw virtual reality data into a plurality of virtual reality render jobs that can be executed on one or more of the virtual reality resources. For example, the virtual reality processing scheduler 805 may divide the raw virtual reality data into shards.

In some embodiments, the virtual reality processing scheduler 805 creates the virtual reality map based on availability of the virtual reality resources, the priority of the virtual reality rendering project, and/or the processing cost of using the virtual reality resources. The virtual reality processing scheduler 805 may create the virtual reality map after receiving data from the virtual processing manager 810 about the availability of each of the virtual reality resources.

In some embodiments, the virtual reality processing manager 810 queries a plurality of virtual reality resources to determine the availability of the virtual reality resources. In some embodiments, the virtual reality processing manager 810 may determine the availability of a virtual reality resource based on previously scheduled virtual reality rendering projects, scheduled virtual reality rendering projects, and/or executing virtual reality processing maps. In some embodiments, the virtual reality processing manager 810 may manage the processing of a virtual reality map across a plurality of virtual reality resources. In some embodiments, the virtual reality processing manager 810 redistributes the processing of one or more virtual reality render jobs in the event of a failure or slowdown at one or more of the virtual reality resources.

In some embodiments, the virtual reality processing optimization module 815 may determine a cost associated with using a given virtual reality resource. The virtual reality resources may be financially more costly depending on the time of day the virtual reality resources are used. In some embodiments, the cost of a virtual reality resource may depend on the current demand on the virtual reality resource. In some embodiments, the cost of a virtual reality resource may change dynamically.

In some embodiments, the cost associated with a virtual reality resource may be a time-based cost. For instance, processing a virtual reality render job at a given virtual reality resource may be more time consuming based on the time it takes to transmit data to the remote location of the virtual reality resource, based on the processing power of the virtual reality resource, etc.

In some embodiments, the virtual reality processing scheduler 805, the virtual reality processing manager 810, and/or the virtual reality optimization module 815 may be in communication via the network 105. In some embodiments, the virtual reality processing scheduler 805, the virtual reality processing manager 810, and/or the virtual reality optimization module 815 may be in direct communication.

In some embodiments, a network 105 such as, for example the Internet, may communicatively couple the virtual reality processing scheduler 805, the virtual reality processing manager 810, the virtual reality optimization module 815, the graphical processing units 820, and/or the storage 825.

In some embodiments, the virtual reality processing system 800 may schedule and/or manage the processing, stitching, rendering, etc. of raw virtual reality video data into one or more virtual reality videos.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A system comprising:
a non-transitory memory storing instructions; and
at least one processor communicatively coupled to the memory and configured to execute the instructions to:
receive raw virtual reality video data representing images recorded by camera modules of a camera array;
stitch the images together to generate an initial virtual reality render;
determine that the initial virtual reality render has a stitching error; and generate a corrected virtual reality render that corrects the stitching error.

2. The system of claim 1, wherein the at least one processor is further configured to execute the instructions to:
transmit the initial virtual reality render to a user device; and
receive, from the user device, information about the stitching error.

3. The system of claim 2, wherein the information about the stitching error indicates a location of the stitching error within the initial virtual reality render.

4. The system of claim 1, wherein the at least one processor is further configured to execute the instructions to:
transmit the initial virtual reality render to a user device; and
receive, from the user device, a correction to the stitching error, the correction configured to be used to generate the corrected virtual reality render.

5. The system of claim 1, wherein:
the at least one processor is configured to stitch the images together to generate the initial virtual reality render by applying a stitching algorithm to the images; and
the at least one processor is configured to generate the corrected virtual reality render by modifying the stitching algorithm based on a correction to the stitching error and applying the modified stitching algorithm to the images.

6. The system of claim 1, wherein the stitching error comprises a visual discontinuity caused by an object that is close to one or more of the camera modules of the camera array when the raw virtual reality video data is recorded and that crosses a stitching boundary in the initial virtual reality render.

7. The system of claim 1, wherein the stitching error comprises one of:
a stitching artifact at a stitching boundary between the images;
a parallax error;
a color error;
a horizon line error; and
a synchronization error.

8. The system of claim 1, wherein the non-transitory memory storing instructions and the at least one processor are implemented by a cloud-based virtual reality processing server.

9. A method comprising:
receiving raw virtual reality video data representing images recorded by camera modules of a camera array;
stitching the images together to generate an initial virtual reality render;
determining that the initial virtual reality render has a stitching error; and
generating a corrected virtual reality render that corrects the stitching error.

10. The method of claim 9, further comprising:
transmitting the initial virtual reality render to a user device; and
receiving, from the user device, information about the stitching error.

11. The method of claim 10, wherein the information about the stitching error indicates a location of the stitching error within the initial virtual reality render.

12. The method of claim 9, further comprising:
transmitting the initial virtual reality render to a user device; and
receiving, from the user device, a correction to the stitching error, the correction configured to be used to generate the corrected virtual reality render.

13. The method of claim 9, wherein:
stitching the images together to generate the initial virtual reality render comprises applying a stitching algorithm to the images; and
generating the corrected virtual reality render comprises modifying the stitching algorithm based on a correction and applying the modified stitching algorithm to the images.

14. The method of claim 9, wherein the stitching error comprises a visual discontinuity caused by an object that is close to one or more of the camera modules of the camera array when the raw virtual reality video data is recorded and that crosses a stitching boundary in the initial virtual reality render.

15. The method of claim 9, further comprising:
generating virtual reality content based on the corrected virtual reality render; and
providing, by way of a network, the virtual reality content from a cloud-based server to a viewing device.

16. A non-transitory memory storing instructions executable by one or more processors to perform operations comprising:
receiving raw virtual reality video data representing images recorded by camera modules of a camera array;
stitching the images together to generate an initial virtual reality render;
determining that the initial virtual reality render has a stitching error; and
generating a corrected virtual reality render that corrects the stitching error.

17. The non-transitory memory of claim 16, wherein the instructions are further executable by the one or more processors to perform operations comprising:
transmitting the initial virtual reality render to a user device; and
receiving, from the user device, information about the stitching error.

18. The non-transitory memory of claim 17, wherein the information about the stitching error indicates a location of the stitching error within the initial virtual reality render.

19. The non-transitory memory of claim 16, wherein the instructions are further executable by the one or more processors to perform operations comprising:
transmitting the initial virtual reality render to a user device; and
receiving, from the user device, a correction to the stitching error, the correction configured to be used to generate the corrected virtual reality render.

20. The non-transitory memory of claim 16, wherein the instructions are executable by the one or more processors to:
stitch the images together to generate the initial virtual reality render by applying a stitching algorithm to the images; and
generate the corrected virtual reality render by modifying the stitching algorithm based on a correction and applying the modified stitching algorithm to the images.

* * * * *